United States Patent
Niimi et al.

(10) Patent No.: US 11,597,139 B2
(45) Date of Patent: Mar. 7, 2023

(54) SOLID FREEFORM FABRICATION OBJECT, METHOD OF MANUFACTURING SOLID FREEFORM FABRICATION OBJECT, LIQUID SET FOR SOLID FREEFORM FABRICATION, AND DEVICE FOR MANUFACTURING SOLID FREEFORM FABRICATION OBJECT

(71) Applicant: RICOH COMPANY, LTD., Tokyo (JP)

(72) Inventors: Tatsuya Niimi, Kanagawa (JP); Takashi Matsumura, Kanagawa (JP); Takuya Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 315 days.

(21) Appl. No.: 16/797,670

(22) Filed: Feb. 21, 2020

(65) Prior Publication Data

US 2020/0269490 A1    Aug. 27, 2020

(30) Foreign Application Priority Data

Feb. 22, 2019 (JP) .............................. JP2019-030121
Dec. 25, 2019 (JP) .............................. JP2019-235111

(51) Int. Cl.
*B29C 64/112* (2017.01)
*B29C 64/264* (2017.01)
(Continued)

(52) U.S. Cl.
CPC .......... *B29C 64/112* (2017.08); *B29C 64/264* (2017.08); *B29C 64/30* (2017.08); *B33Y 10/00* (2014.12); *B33Y 30/00* (2014.12); *B33Y 40/20* (2020.01); *B33Y 70/10* (2020.01); *B33Y 80/00* (2014.12)

(58) Field of Classification Search
CPC ..... B29C 64/112; B29C 64/264; B29C 64/30; B33Y 10/00; B33Y 30/00; B33Y 40/20; B33Y 70/10; B33Y 80/00
See application file for complete search history.

(56) References Cited

U.S. PATENT DOCUMENTS

| 5,059,266 A | 10/1991 | Yamane et al. |
| 6,658,314 B1 | 12/2003 | Gothait |

(Continued)

FOREIGN PATENT DOCUMENTS

| EP | 3 291 208 A1 | 3/2018 |
| JP | 2013-043409 | 3/2013 |
| JP | 2017-105154 | 6/2017 |

OTHER PUBLICATIONS

Extended European Search Report dated Jul. 20, 2020 in European Patent Application No. 20158544.5, 6 pages.

*Primary Examiner* — Nahida Sultana
(74) *Attorney, Agent, or Firm* — Grüneberg and Myers PLLC

(57) ABSTRACT

A solid freeform fabrication object includes a plurality of parts formed of hydrogels having respective physical properties, wherein the hydrogels having respective physical properties, each having a moisture content of 70 percent by mass or greater, wherein a solvent concentration difference between the hydrogel constituting adjacent parts of the plurality of parts is 5 percent by mass or less.

15 Claims, 6 Drawing Sheets

(51) Int. Cl.
*B29C 64/30* (2017.01)
*B33Y 10/00* (2015.01)
*B33Y 30/00* (2015.01)
*B33Y 80/00* (2015.01)
*B33Y 40/20* (2020.01)
*B33Y 70/10* (2020.01)

(56) References Cited

U.S. PATENT DOCUMENTS

| | | |
|---|---|---|
| 2016/0136888 A1* | 5/2016 | Bayley ................ C09B 67/0097 264/294 |
| 2017/0008228 A1 | 1/2017 | Iwata et al. |
| 2017/0022348 A1 | 1/2017 | Iwata et al. |
| 2017/0217090 A1* | 8/2017 | Endoh .................. B29C 64/112 |
| 2017/0270831 A1 | 9/2017 | Norikane et al. |
| 2017/0326645 A1 | 11/2017 | Saito et al. |
| 2017/0369607 A1 | 12/2017 | Iwata et al. |
| 2018/0061279 A1 | 3/2018 | Niimi et al. |
| 2018/0126651 A1 | 5/2018 | Matsumura et al. |
| 2018/0345036 A1 | 12/2018 | Niimi et al. |
| 2018/0345574 A1 | 12/2018 | Matsumura et al. |
| 2019/0010259 A1 | 1/2019 | Iwata et al. |
| 2019/0175151 A1 | 6/2019 | Niimi et al. |
| 2019/0300628 A1 | 10/2019 | Saito et al. |

* cited by examiner

SOLID FREEFORM FABRICATION OBJECT, METHOD OF MANUFACTURING SOLID FREEFORM FABRICATION OBJECT, LIQUID SET FOR SOLID FREEFORM FABRICATION, AND DEVICE FOR MANUFACTURING SOLID FREEFORM FABRICATION OBJECT

CROSS-REFERENCE TO RELATED APPLICATIONS

This patent application is based on and claims priority pursuant to 35 U.S.C. § 119 to Japanese Patent Application Nos. 2019-030121 and 2019-235111, filed on Feb. 22, 2019 and Dec. 25, 2019, respectively, in the Japan Patent Office, the entire disclosures of which are hereby incorporated by reference herein.

BACKGROUND

Technical Field

The present disclosure relates to a solid freeform fabrication object, a method of manufacturing a solid freeform fabrication object, a liquid set for solid freeform fabrication, and a device for manufacturing a solid freeform fabrication object.

Description of the Related Art

Hydrogels are formed of a network structure formed by a dispersoid such as polymers taking in water as a dispersion medium. Depending on the amount (concentration) of the dispersion medium, hydrogels greatly vary in physical properties (such as compressive stress, tensile strength, and elastic modulus). In other words, physical properties of gels can be controlled based on the concentration of the dispersion medium.

Since hydrogels contain a large amount of water close to human bodies, physical properties and tactual sense thereof are close to those of human bodies. For this reason, hydrogels are developed as materials for medical models for, for example, organs and skin, and are effectively utilized for reproduction of various body parts based on physical property control.

Three-dimensional printing or additive manufacturing (AM) are known for the technique to fabricate a three-dimensional object.

This technology calculates cross-sections sliced along the lamination direction of an object and forms and laminates respective layers according to the shape of the cross-sections to fabricate the object.

SUMMARY

According to embodiments of the present disclosure, provided is a solid freeform fabrication object which includes a plurality of parts formed of hydrogels having respective physical properties, wherein the hydrogels having respective physical properties, each having a moisture content of 70 percent by mass or greater, wherein a solvent concentration difference between the hydrogel constituting adjacent parts of the plurality of parts is 5 percent by mass or less.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 9A is a diagram illustrating a cross section from a side, and FIG. 9B is a diagram viewed from above.

Figure 1:
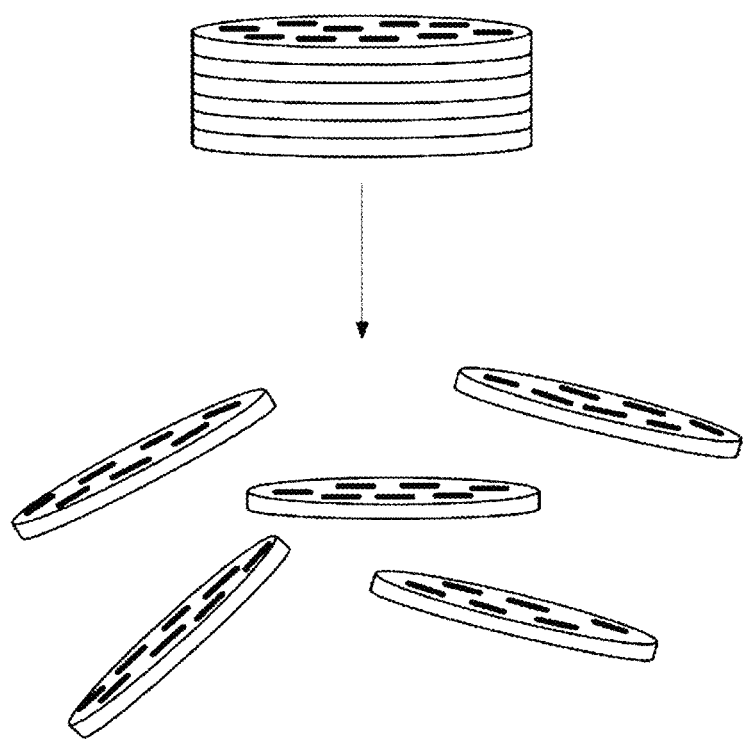
FIG. 1 is a schematic diagram illustrating an example of a water-swellable laminate clay mineral as a mineral and an example of a state in which a water-swellable laminate clay mineral is dispersed in water.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Known methods of manufacturing a solid freeform fabrication object include, but are not limited to, for example, a fused deposition molding (FDM) method, an ink jetting method, a binder jetting method, a material jetting method, a stereo lithography apparatus (SLA) method, and a powder selective laser sintering (SLS). Of these, images of photocurable liquid resins are formed at positions for a solid freeform fabrication object by the material jetting method and multi-layered to form the solid freeform fabrication object.

A device for manufacturing the solid freeform fabrication object has been proposed in JP-5408207-B1 (JP2013-43409-A1), which laminates forming materials according to the filling ratio or the mixing ratio indicating the degree of density of the forming materials and changes the mass by using different materials depending on regions or parts to fabricate a three-dimensional object.

Another device for fabricating a three-dimensional object has been proposed in U.S. Pat. No. 5,059,266, which includes a head configured to discharge a material for forming a large part of an object and a head configured to discharge a material for forming a small part of the object.

A yet another device for fabricating a three-dimensional object has been proposed in U.S. Pat. No. 6,658,314, which includes a plurality of inkjet heads including heads configured to discharge a plurality of photo polymers having different elasticity after curing.

Also, a fabrication method has been proposed in JP-2017-105154-A1 which includes changing the proportion of a plurality of hydrogel precursors having respective compositions to fabricate a three-dimensional object, thereby imparting a physical property distribution in the object.

According to the present disclosure, a solid freeform fabrication object is provided which includes a plurality of parts formed of hydrogels having respective physical properties with less temporal changes.

Solid Freeform Fabrication Object

The solid freeform fabrication object of the present disclosure has a plurality of parts formed of hydrogels having respective physical properties and maintains the state (shape, properties, etc.) over time.

The solid freeform fabrication object of the present disclosure has a plurality of parts formed of hydrogels having respective physical properties and each of the hydrogels having a moisture content of 70 percent by mass or greater and the solvent concentration difference between the hydrogels constituting adjacent parts of the plurality of parts is 5 percent by mass or less.

In the solid freeform fabrication object of the present disclosure, it is preferable that each of the hydrogels having respective physical properties contain a hydrogel containing a water-containing solvent, a polymer, and a mineral. The hydrogels further contain other optional components. The solid freeform fabrication object is preferably made of a hydrogel enclosing the water-containing solvent in a three-dimensional network structure formed of a composite of the mineral dispersed in the solvent and the polymer polymerized from a polymerizable monomer.

When the solid freeform fabrication object of the present disclosure includes three or more parts having respective physical properties, the solvent is transferred between parts not adjacent to each other via the part adjacent to both the parts. Therefore, in the solid freeform fabrication object of the present disclosure in a preferable embodiment, all the hydrogels constituting the plurality of parts having respective physical properties have a concentration difference of the solvent of 5 percent by mass or less.

Hydrogel

It is preferable that the hydrogel contain at least a water-containing solvent, a polymer, and a mineral. In particular, it is preferable that the hydrogel contain the water-containing solvent in a three-dimensional network structure formed as a composite of the mineral dispersed in the solvent with the polymer obtained through polymerization of a polymerizable monomer.

Details of various materials constituting the hydrogel will be described together with the manufacturing method later.

Configuration of Solid Freeform Fabrication Object

The solid freeform fabrication object of the present disclosure includes a plurality of parts formed of hydrogels having respective physical properties. The physical properties refer to hardness, elastic modulus, elongation, etc. of the hydrogel. The physical property of a hydrogel is known to vary depending on the moisture content of the gel. Generally, the physical property of a hydrogel is controlled based on adjustment of the moisture content.

In the present disclosure, portions of the solid freeform fabrication object formed of hydrogels having respective physical properties are each referred to as "parts". In a liquid film of hydrogel liquid precursor mixtures produced during manufacturing the solid freeform fabrication object, portions occupied by hydrogel liquid precursor mixtures having respective application amount ratios are each referred to as "regions". Also, in a hydrogel layer obtained by curing the liquid film, portions occupied by a plurality of hydrogels having respective physical properties are each referred to as "regions".

Figure 2:
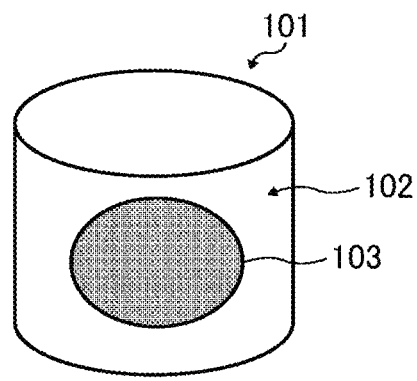
FIG. 2 is a schematic diagram illustrating an example of a solid freeform fabrication object including a plurality of parts formed of hydrogels having respective physical properties, one part enclosing the other having a different moisture content.
Figure 3:
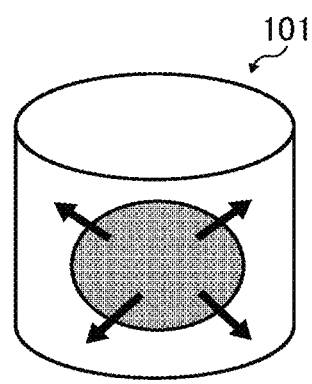
FIG. 3 is a conceptual diagram illustrating transfer of water due to a concentration gradient of moisture content.

FIG. 2 is a diagram illustrating a solid freeform fabrication object (101) including a plurality of parts formed of hydrogels having respective physical properties, i.e., enclosing parts having different moisture contents. A part (103) having a higher moisture content is enclosed in a part (102) having a lower moisture content. This state can be maintained until immediately after fabrication. However, water transfers from the part (103) having a higher moisture content to the part (102) having a lower moisture content over time (FIG. 3).

This phenomenon occurs when adjacent two parts have different moisture contents, in the form of transfer (diffusion) of water from the part having a higher water concentration to the part having a lower water concentration due to the water concentration gradient. This phenomenon continues until the moisture contents of both parts become an equilibrium state (almost equal concentrations). As a result, the moisture contents of the adjacent two parts become almost equal, to change the physical properties of the parts. The part deprived of the water also undergoes a phenomenon of volume reduction, to deform the solid freeform fabrication object as a result.

The same phenomenon applies not only to water, but also to unbound (i.e., not involved in chemical bonding) low-molecular-weight materials constituting hydrogels. Specifically, organic solvents other than water fall within the category of such low-molecular-weight materials.

In order to overcome this problem, what matters is to reduce as much as possible the difference between the concentrations of the solvents (the water+organic solvent) contained in the hydrogels of adjacent two parts having respective physical properties. It is ideal to make the concentrations of the solvents equal, but there are cases where the concentrations of the solvents cannot be completely equal due to, for example, desired physical properties and limitations on the prescriptions. However, so long as the concentration difference between adjacent two parts is within 5 percent by mass, the concentration difference is less influential.

Since transfer of water is heavier as the moisture contents of hydrogels are lower, what matters is that the moisture contents of the hydrogels are 70 percent by mass or greater in the entire solid freeform fabrication object (in all parts). With the moisture contents set to this concentration, not only does the difference between the moisture contents become less influential, but also conditions close to the composition of human body, which is expected of hydrogels are reproduced. For example, dealing with electric devices (such as electric scalpels) used in medical treatment, and ultrasonic conductivity (adaptation to echoes and ultrasonic diagnoses) are achieved.

An example of applications of the solid freeform fabrication object of the present disclosure include, but are not limited to, biological models, preferably organ models (for example, organ models for humans). The optimal moisture contents of the hydrogels used for fabrication (or production) of the solid freeform fabrication object of the present disclosure may vary depending on the applications of the solid freeform fabrication object, but are preferably equal or close to the moisture contents of the tissues serving as models when, for example, the solid freeform fabrication object is used as organ models for humans. Generally, the moisture contents of human organs are known to be about from 70 to 85 percent by mass. For example, the moisture content of a heart is about 80 percent by mass, the moisture content of a kidney is about 83 percent by mass, and the moisture contents of a brain and bowels are about 75 percent by mass. Hence, the moisture contents of the hydrogels of the solid freeform fabrication object of the present disclosure are preferably 75 percent by mass or greater and more preferably 80 percent by mass or greater.

Method of Manufacturing Solid Freeform Fabrication and Device for Freeform Fabrication Object The method of manufacturing a solid freeform fabrication object of the present disclosure includes applying a plurality of hydrogel liquid precursors to form a liquid film while controlling an application position and an application amount of the plurality of hydrogel liquid precursors, each of the plurality of hydrogel liquid precursors having a moisture content of 70 percent by mass or greater and having a solvent concentration difference of within 5 percent by mass from each other, curing the liquid film to obtain a cured film including a plurality of regions formed of hydrogels having respective physical properties, and laminating the cured film.

A solid freeform fabrication object obtained by the method of manufacturing solid freeform fabrication object is the solid freeform fabrication object of the present disclosure.

The method of manufacturing a solid freeform fabrication of the present disclosure includes repeating applying the plurality of hydrogel liquid precursors at the same position with an amount ratio in a same plane while changing at least one of the application position and the amount ratio to produce a plurality of regions formed of hydrogel precursor mixtures having respective application amount ratios in the liquid film forming a same layer.

Techniques for achieving multi-materials using a plurality of inks have been known as object fabrication techniques of three-dimensional printers (solid freeform fabrication object manufacturing device: material jetting) employing inkjet methods. Further, as described in JP-2017-105154-A1, it is known to use two compositionally different liquids (corresponding to the hydrogel liquid precursors of the present disclosure) and control the application positions and application amounts to control the physical property values of hydrogels and impart a distribution of the physical property value.

However, during actual fabrication of solid freeform fabrication objects with hydrogels, the inventors have encountered cases where the desired physical property distribution may change due to temporal change after the fabrication, failing to achieve highly accurate solid freeform fabrication object fabrication based on physical property control with multi-materials. The present disclosure was thus made based on a finding that it is not possible to take full advantage of effectiveness of hydrogels if this problem remains.

The method of manufacturing a solid freeform fabrication object of the present disclosure repeats a first step of applying hydrogel liquid precursors and a second step of curing a liquid film a plurality of times. There is no specific limitation on how many times the applying (first step) and the curing (second step) are repeated. It can be suitably selected depending on the size and form of a solid freeform fabrication object to be manufactured.

With regard to the size of the solid freeform fabrication object, the average thickness per layer is preferably from 10 to 50 μm after curing. When the average thickness is from 10 to 50 μm, it is possible to accurately manufacture a solid freeform fabrication object free of peel-off so that the layers are piled up as high as the solid freeform fabrication object.

Taking an embodiment of using two types of hydrogel liquid precursors as an example, the details of the present disclosure will be described below. The present disclosure is not limited to such embodiments. A person having ordinary skill readily understands other embodiments (for example, an embodiment of using three or more kinds of hydrogel liquid precursors) from this description.

The method of manufacturing a solid freeform fabrication object forms and laminates the liquid film continuously having a plurality of regions having respective physical properties of hydrogels obtained by curing while controlling the application position and the application amounts of a first hydrogel liquid precursor and a second hydrogel liquid precursor compositionally different from the first hydrogel liquid precursor, thereby efficiently manufacturing a solid freeform fabrication object having hydrogels having individually different properties such as compressive stress and elastic modulus from part to part.

The plurality of regions that form hydrogels having respective physical properties by curing are continuously present within the same film obtained in the first step. It is preferable that the physical properties of hydrogels obtained by curing obtained in the first step continuously changes in the same film.

The application position and the application amount of the first hydrogel liquid precursor and the second hydrogel liquid precursor are not particularly limited and can be suitably selected depending on a particular application as long as they are different in a formed layer or in the same film.

In addition, it is also preferable that the method of manufacturing a solid freeform fabrication object include an embodiment including a liquid applying step (first step) to apply the first hydrogel liquid precursor and the second hydrogel liquid precursor in the liquid set for manufacturing a solid freeform fabrication object described later and a film curing process to cure the liquid film formed in the liquid application step.

Each process in the method of manufacturing a solid freeform fabrication object is described in detail.

First Process and First Device

The first process includes applying the first hydrogel liquid precursor and the second hydrogel liquid precursor compositionally different from the first hydrogel liquid precursor to the same position.

The first process is suitably conducted by a liquid applying device to apply the first hydrogel liquid precursor and the second hydrogel liquid precursor.

There is no specific limitation to the method of applying the first hydrogel liquid precursor and the second hydrogel liquid precursor as long as liquid droplets are applied to a target region with an appropriate precision. The method can be suitably selected depending on a particular application. For example, a liquid discharging method is suitable. For example, the liquid discharging method includes a dispenser method, a spray method, or an inkjet method. Known devices are suitably used to execute these methods.

Of these, the dispenser method is excellent liquid quantitative property but the application area is small. The spray method is capable of simply forming a fine discharging material, has a wide application area, and demonstrates excellent applicability but the quantitative property thereof is poor so that powder scatters due to the spray stream. The inkjet method has a good quantitative property in comparison with the spray method and a wider application area in comparison with the dispenser method. Accordingly, the inkjet method is capable of accurately and efficiently forming a complex object. For this reason, in the present invention, using the inkjet method is preferable.

When the liquid discharging method is used, it is preferable to have a nozzle capable of discharging the first hydrogel liquid precursor and the second hydrogel liquid precursor. As the nozzle, nozzles in a known inkjet printer can be suitably used. For example, it is possible to use MH5420/5440 (manufactured by Ricoh Industry Company, Ltd.) as the inkjet printer. It is preferable to use the inkjet printer in terms that the printer can drip a large amount of the liquid from the head portion at once and the application area is large, which accelerates the application.

First Hydrogel Liquid Precursor

It is preferable that a hydrogel be formed of a water-containing solvent, a polymer, and a mineral. In particular, it is preferable that the hydrogel contain water in a three-dimensional network structure formed as a composite of the mineral dispersed in the solvent with the polymer obtained through polymerization of a polymerizable monomer.

A hydrogel liquid precursor, i.e., the precursor of the hydrogel, contains a solvent containing water and an optional organic solvent, a polymerizable monomer, a mineral, and other optional components. The polymerizable monomer forms the polymer as the component of the hydrogel through polymerization. During the polymerization, content of the water and the optional organic solvent would be maintained, thus the weight ratio of solvents of the hydrogel liquid precursor would be substantially equal to those of the hydrogel.

Polymer

As the polymer, polymers having, for example, an amide group, an amino group, a hydroxyl group, a tetramethyl ammonium group, a silanol group, an epoxy group, etc. are suitable and the polymer is preferably water-soluble.

Homopolymers (monopolymers), heteropolymers (copolymers), modified resins, or forms of salts are also allowed. Also, known functional groups can be introduced into these. Of these, homoplymers are preferable.

The polymer being water-soluble in the present disclosure means, for example, when 1 g of a polymer is mixed with and stirred in 100 g of water at 30 degrees C., 90 percent by mass or more of the polymer is dissolved in water.

Polymerizable Monomer

There is no specific limitation to the polymerizable monomer and a suitable polymerizable material is selected depending on a particular application. For example, compounds having a photopolymerizable functional group is preferable.

For example, compounds including an ethylenic unsaturated group curable by a photopolymerization initiator producing a radical such as a (meth)acryloyl group, a vinyl group, and an allyl group and compounds having a cyclic ether group curable by a photoacid generator producing an acid such as an epoxy group are preferable. In terms of curing property, compounds including an ethylenic unsaturated group are more preferable.

Examples of the compound including an ethylenic unsaturated group are compounds having (meth)acrylamide group, (meth)acrylate compounds, compounds having a (meth) acryloyl group, compounds having a vinyl group, and compounds having an allyl group.

As the polymerizable monomer, for example, mono-functional polymerizable monomers and polyfunctional polymerizable monomers are suitable. These can be used alone or in combination.

Mono-Functional Polymerizable Monomer

Specific examples of the mono-functional polymerizable monomer include, but are not limited to, acrylamide, N-substituted acrylamide derivatives, N,N-di-substituted acrylamide derivatives, N-substituted methacrylamide derivatives, N—N-di-substituted methcrylamide derivatives, 2-etylhexyl(meth)acrylate (EHA), 2-hydroxyethyl(meth)acrylate (HEA), 2-hydroxypropyl(meth)acrylate (HPA), caprolactone-modified tetrahydrofurfuryl(meta)acrylate, isobonyl (meth)acrylate, 3-methoxybutyl(meth)acrylate, tetrahydro furfuryl(meth)acrylate, lauryl(meth)acrylate, 2-phenoxyethyl (meth)acrylate, isodecyl(meth)acrylate, isooctyl(meth) acrylate, tridecyl(meth)acrylate, caprolactone(meth)acrylate, and ethoxylated nonylphenol(meth)acrylate. These can be used alone or in combination. Of these, acrylamide, N,N-dimethylacrylamide, N-isopropylacrylamide, and acryloyl morpholine are preferable.

Organic polymers can be obtained by polymerizing the mono-valent polymerizable monomer.

The proportion of the mono-functional polymerizable monomer is from 0.5 to 20 percent by mass to the total amount of the mono-functional polymerizable monomer.

Polyfunctional Polymerizable Monomer

The polyfunctional polymerizable monomer includes a bi-functional polymerizable monomer and a tri- or higher functional polymerizable monomer. These can be used alone or in combination.

Specific examples of the bi-functional polymerizable monomers include, but are not limited to, tripropylene glycol di(meth)acrylate, tri ethylene glycol di(meth)acrylate, tetraethylene glycol di(meth)acrylate, polypropylene glycol di(meth)acrylate, neopentyl glycol hydroxypivalic acid ester di(meth)acrylate (MANDA), hydroxypivalic acid neopentyl glycol ester di(meth)acrylate (HPNDA), 1,3-butanediol di(meth)acrylate (BGDA), 1,4-butanediol di(meth)acrylate (BUDA), 1,6-hexanediol di(meth)acrylate (HDDA), 1,9-nonanediol di(meth)acrylate, diethylene glycol di(meth)acrylate (DEGDA), neopentyl glycol di(meth)acrylate (NPGDA), tripropylene glycol di(meth)acrylate (TPGDA), caprolactone-modified hydroxypivalic acid neopentyl glycol ester di(meth)acrylate, propoxylated neopentyl glycol di(meth)acrylate, ethoxy-modified bisphenol A di(meth)acrylate, polyethylene glycol 200 di(meth)acrylate, polyethylene glycol 400 di(meth)acrylate, and methylene bisacrylamide. These can be used alone or in combination.

Specific examples of the tri- or higher functional polymerizable monomers include, but are not limited to, trimethylolpropane tri(meth)acrylate (TMPTA), pentaerythritol tri (meth)acrylate (PETA), dipentaerythritol hexa(meth)acrylate (DPHA), triallyl isocyanate, ε-caprolactone-modified dipentaerythritol (meth)acrylate, tris(2-hydroxyethyl)isocyanurate tri(meth)acrylate, ethoxylated trimethylolpropane tri(meth)acrylate, propoxylated trimethylolpropane tri(meth)acrylate, propoxylated glyceryl tri (meth)acrylate, pentaerythritol tetra(meth)acrylate, dipentaerythritol hydroxypenta (meth)acrylate, ditrimethylolpropane tetra(meth)acrylate, ethoxylated pentaerythritol tetra(meth)acrylate, and penta (meth)acrylate ester. These can be used alone or in combination.

The proportion of the polyfunctional polymerizable monomer is from 0.01 to 10 mol percent to the total amount of the mono-functional monomer in the first hydrogel liquid precursor. When the proportion is from 0.01 to 10 mol percent, gel properties can be easily adjusted.

Water

As the water, pure water and hyper pure water such as deionized water, ultrafiltered water, reverse osmosis water, and distilled water can be used.

It is suitable to dissolve or disperse other components such as organic solvents in the water to impart moisturizing property, antibiotic property, or electroconductive property and adjust hardness.

In the present disclosure, the factor that matters is the moisture content (water concentration) of a hydrogel on the whole, which is 70 percent by mass or greater of the whole.

Mineral

The mineral has no particular limit and can be suitably selected depending on a particular application. For example, water swellable laminate clay minerals are suitable.

The water-swellable laminate clay mineral includes crystal having a two-dimensional disk-like form having unit lattices in the crystal. Single layers of the water-swellable laminate clay mineral dispersed in water are piled up as illustrated on the upper part of FIG. 1. When the laminate mineral is dispersed in water, the mineral is separated into each single layer having a disk-like form as illustrated on the lower part of FIG. 1.

Examples of such clay minerals are water swellable smectite and water swellable mica.

Specific examples include, but are not limited to, water swellable hectorite containing sodium as an interlayer ion, water swellable montmorillonite, water swellable saponite, and water swellable synthesized mica. These can be used alone or in combination. Of these, water swellable hectorite is preferable to obtain a solid freeform fabrication object having high elasticity.

The water swellable hectorite can be appropriately synthesized or is available on market. Specific examples of the product available on the market include, but are not limited to, synthesized hectorite (laponite XLG, manufactured by RockWood), SWN (manufactured by Coop Chemical Ltd.), and fluorinated hectorite SWF (manufactured Coop Chemical Ltd.). Of these, synthetic hectorite is preferable in terms of elastic modulus of the solid freeform fabrication object.

"Water swellable" means that water molecules are inserted between layers of the laminate clay mineral is dispersed as illustrated in FIG. 1.

The proportion of the mineral to the total amount of the solid freeform fabrication object is preferably from 1 to 40 percent by mass and more preferably from 1 to 25 percent by mass in terms of elastic modulus and hardness of the solid freeform fabrication object.

Organic Solvent

Inclusion of the organic solvent is suitable to enhance moisture retention of a solid freeform fabrication object.

Specific examples of the organic solvent include, but are not limited to, alkyl alcohols having 1 to 4 carbon atoms, amides, ketones, ketone alcohols, ethers, polyvalent alcohols, polyalkylene glycols, lower alcohol ethers of polyvalent alcohols, alkanol amines, and N-methyl-2-pyrrolidone. These can be used alone or in combination.

Of these, polyvalent alcohols are preferable in terms of a moisture retention. Specific examples of organic solvents that can be suitably used include, but are not limited to, polyvalent alcohols such as ethylene glycol, propylene glycol, 1,2-propanediol, 1,2-butanediol, 1,3-butanediol, 1,4-butanediol, diethylene glycol, triethylene glycol, 1,2,6-hexanetriol, thioglycol, hexylene glycol, and glycerin.

The proportion of the organic solvent is preferably from 1 to 10 percent by mass to the total content of a solid freeform fabrication object. When the proportion is 1 percent by mass or greater, the effect of anti-drying can be sufficiently demonstrated. When the proportion is 10 percent by mass or less, the lamellar clay mineral is uniformly dispersed.

Other Optional Components

The other optional components are not particularly limited and can be suitably selected depending on a particular application. Specific examples include, but are not limited to, phosphonic acid compounds such as 1-hydroxyethane-1,1-diphosphonic acid, a stabilizer, a polymerization initiator, a colorant, a viscosity modifier, an adhesive agent, an antioxidant, an age resister, a polymerization promotor, an ultraviolet absorbent, a plasticizer, a preservative, a dispersant, and a drying retardant.

Stabilizer

Stabilizers are used to disperse and stabilize the mineral to keep a sol state. In addition, stabilizers are also optionally used to stabilize properties of the liquid in the liquid discharging method.

As the stabilizer, for example, highly concentrated phosphates, glycols, and non-union surfactants are suitable. Glycol, which is an organic solvent, also serves as a stabilizer.

The non-union surfactants can be synthesized or products available on the market are also usable.

Polymerization Initiator

Examples of the polymerization initiator are thermal polymerization initiators and photopolymerization initiators. Of these, in terms of storage stability, photopolymerization initiators are preferable because it produces a radical or a cation at irradiation of an active energy ray.

As the photopolymerization initiator, any material can be used which produces a radical at irradiation of light (ultraviolet rays in a wavelength range of 220 to 400 nm).

The thermal polymerization initiator has no particular limitation and can be suitably selected depending on a particular application. Examples thereof are azo-based initiators, peroxide initiators, persulfate initiators, and redox (oxidation-reduction) initiators.

Viscosity Modifier

The viscosity modifier is not particularly limited and can be suitably selected depending on a particular application. For example, propylene glycol, which is an organic solvent, also serves as a viscosity modifier.

Drying Retardant

The drying retardant is not particularly limited and can be suitably selected depending on a particular application. For example, glycerin, which is an organic solvent, also serves as an anti-drying agent.

Dispersant

There is no specific limitation to the dispersant and it can be suitably selected depending on a particular application. A specific example thereof is etidronic acid.

Polymerization Promoter

There is no specific limitation to the polymerization promoter and it can be suitably selected depending on a particular application. A specific example thereof is N,N,N',N'-tetramethylethylene diamine.

The volume of the droplet of the first hydrogel liquid precursor has no particular limitation and can be suitably selected depending on a particular application. For example, the volume is preferably from 2 to 60 pL and more preferably from 15 to 30 pL. When the volume of the droplet of the first hydrogel liquid precursor is 2 pL or greater, the discharging stability is improved. When the volume is 60 pL or less, filling a discharging nozzle for forming (shape-forming) with liquid is easy.

There is no specific limitation to the proportion (percent by mass) of the first hydrogel liquid precursor in the liquid film formed in the first process. It can be selected depending on a particular application. The proportion can be controlled based on the application amount of the first hydrogel liquid precursor.

The application amount of the first hydrogel liquid precursor is calculated by multiplying the volume of the liquid droplet of the first hydrogel liquid precursor by the number of droplets in the first hydrogel liquid precursor.

There is no specific limitation to the surface tension of the first hydrogel liquid precursor and it can be selected depending on a particular application. For example, the surface tension is preferably from 20 to 45 mN/m and more preferably from 25 to 34 mN/m.

When the surface tension is 20 mN/m or greater, discharging stability is improved. When the surface tension is 45 mN/m or less, filling a discharging nozzle for fabrication with liquid is easy.

Surface tension can be measured by a surface tensiometer (automatic contact angle DM-701, manufactured by Kyowa Interface Science Co., LTD.), etc.

Viscosity of the first hydrogel liquid precursor has no particular limitation and can be suitably selected depending on a particular application. The temperature can be adjusted.

For example, the viscosity is preferably from 3 to 20 mPa·s and more preferably from 6 to 12 mPa·s at 25 degrees C.

When the viscosity is from 3 to 20 mPa·s, discharging stability can be improved. Viscosity can be measured by, for example, a rotation viscometer (VISCOMATE VM-150 III, manufactured by TOKI SANGYO CO., LTD.) in a 25 degrees C. environment.

Second Hydrogel Liquid Precursor

The second hydrogel liquid precursor is compositionally different from the first hydrogel liquid precursor, has a different physical property value from the first hydrogel liquid precursor during curing, and exerts a function of controlling the physical properties of the solid freeform fabrication object (hydrogels) through film formation by mixing of both precursors.

That is, in the present disclosure, the first hydrogel liquid precursor and the second hydrogel liquid precursor are deposited at the same position in order that both liquids mix with each other. The curable material components during film formation are adjusted through control of the application positions and the application amounts of the first hydrogel liquid precursor and the second hydrogel liquid precursor.

As the materials constituting the second hydrogel liquid precursor, the same materials as specified as the materials for constituting the first hydrogel liquid precursor described above can be used.

However, the types and the concentrations of the materials to be contained are varied to make the physical property values of the hydrogel during curing different from the first hydrogel liquid precursor. Above all, it is effective to vary the type and/or the concentration of the mineral and the type and/or the concentration of the monomer.

Of the materials constituting the hydrogel liquid precursors, the multi-functional polymerizable monomer can be taken up as a material having a great impact on physical properties.

The multi-functional polymerizable monomer can serve as a cross-linking agent for building a hydrogel network structure. Therefore, the multi-functional polymerizable monomer is significantly involved in physical properties of the hydrogels such as strength.

The proportion of the multi-functional polymerizable monomer in the materials constituting the hydrogel liquid precursors is small. For this reason, the multi-functional polymerizable monomer is effective as a control factor since the compositional ratio of the materials of the hydrogel liquid precursors is not extremely significantly changed (i.e., the solvent concentration difference is not significantly changed) by changing the content of the multi-functional polymerizable monomer. It is very effective to vary the type and/or the concentration of the multi-functional polymerizable monomer for control of physical properties of hydrogels.

In addition, in the inkjet method, to which the present disclosure is applied, controlling the ink viscosity matters. However, viscosity does not significantly fluctuate by changing the type and/or the concentration of the multi-functional polymerizable monomer having a small proportion in the hydrogel liquid precursors. Therefore, changing the type and/or the concentration of the multi-functional polymerizable monomer is effective for the inkjet method.

A requisite condition is that the moisture content of the second hydrogel liquid precursor is 70 percent by mass or greater.

The appropriate ranges of the surface tension and viscosity of the second hydrogel liquid precursor are equivalent to those for the first hydrogel liquid precursor.

There is no specific limitation to the method of controlling the application position and the application amount of the first hydrogel liquid precursor and the second hydrogel liquid precursor. It can be suitably selected depending on a particular application. For example, a control method including changing the volume of a droplet or a control method including changing the number of droplets is suitable.

As described later, the amount ratio between the first hydrogel liquid precursor and the second hydrogel liquid precursor is changed to form regions having respective physical properties. What matters is to control the solvent concentration difference between hydrogels of adjacent regions to within 5 percent by mass. In order to obtain this difference, it is enough to make a control in consideration of the solvent concentrations of the two hydrogel liquid precursors. However, prescribing the two hydrogel liquid precursors to have a solvent concentration difference of within 5 percent by mass from the very beginning makes the control easier.

The solvent concentration in the hydrogel refers to the concentration of the solvent (total of water and an organic solvent) contained in the hydrogel after curing.

Second Process and Second Device

In the second process, the liquid film formed in the first process is cured and the cured film (layer) is laminated, so that a solid freeform fabrication object having different physical property values such as compression stress and modulus of elasticity for each part is manufactured. In the post-curing film, a structure formed of the curable material is formed with other ingredients. The second process (liquid film curing process) is suitably conducted by the following second device (film curing device).

As the second device to cure the film, an ultraviolet (UV) irradiating lamps, electron beam irradiators, etc. are used. The liquid curing device preferably has a mechanism to remove ozone.

The ultraviolet ray irradiating lamp includes, for example, a high pressure mercury lamp, an ultra high pressure mercury lamp, and a metal halide lamp.

The ultra-high pressure mercury lamp is a point light source but if the DeepUV type combined with an optical system to have a high light use efficiency is used, the lamp is capable of emitting light in a short-wavelength range.

Since the metal halide lamp has a wide range of wavelength, it is suitable for colored materials. Halogenated materials of metal such as Pb, Sn, and Fe are used therefor and can be selected depending on absorption spectrum of a photopolymerization initiator. The lamp for use in curing has no particular limit and can be suitably selected depending on a particular application. Lamps available on the market such as H lamp, D lamp, or V lamp (manufactured by Fusion System) can be used.

In the present invention, an ultra violet-light emitting diode (UV-LED) is preferably used.

There is no specific limitation to the emitting wavelength of the LED. In general, wavelengths of 365 nm, 375 nm, 385 nm, 395, nm and 405 nm are used. Taking into account the impact on the color of an object, short wavelength irradiation is advantageous to increase absorption of an initiator.

Since thermal energy imparted by a UV-LED during curing is less than that of ultraviolet irradiation lamp (high pressure mercury lamp, ultra pressure mercury lamp, metal halide lamp) for general purpose and electron beams, the heat damage to a sample is reduced. In particular, the hydrogels formed in the present invention are present containing water. Therefore, the feature thereof is demonstrated and the effect is significant.

Third Process and Third Device

The method of manufacturing a solid freeform fabrication object of the present disclosure may optionally include a third process executed by a third device.

The same device as the first device for use in the device for manufacturing a solid freeform fabrication object can be used as the third device to apply the supporting material liquid.

The third process includes applying a supporting material liquid forming a hard modeling object to support a solid freeform fabrication object formed of the curable material cured in the second process to a region where no hydrogel liquid precursor or second hydrogel liquid precursor is applied to form a film. The third process is conducted by a third device.

Supporting Material Liquid

The supporting material liquid forms a hard modeling object for supporting a solid freeform fabrication object. The supporting material liquid contains a curable material, preferably a polymerization initiator, and other optional components but no water or laminate clay mineral.

It is preferable that the supporting material liquid be compositionally different from the first hydrogel liquid precursor and the second hydrogel liquid precursor.

The curable material is preferably a compound cured in polymerization reaction caused by irradiation of active energy ray (ultraviolet ray, electron beam, etc.), heating, etc. For example, active energy ray curable compounds and thermally-curable compounds are suitable. The curable material is preferably liquid at 25 degrees C.

Applying the supporting material liquid to a region different from the regions to which the first hydrogel liquid precursor and the second hydrogel liquid precursor are applied means that the region to which the supporting material liquid is applied and the regions to which the first hydrogel liquid precursor and the second hydrogel liquid precursor are applied do not overlap each other. Therefore, the supporting material liquid may be deposited adjacent to the first hydrogel liquid precursor and the second hydrogel liquid precursor.

The method of applying the supporting material liquid is not particularly limited and can be suitably selected depending on a particular application. Preferably, droplets formed of the supporting material liquid are applied to target positions with appropriate precision. For example, a liquid droplet discharging method is suitable. Examples of the liquid droplet discharging method are a dispenser method and an inkjet method.

Figure 5:
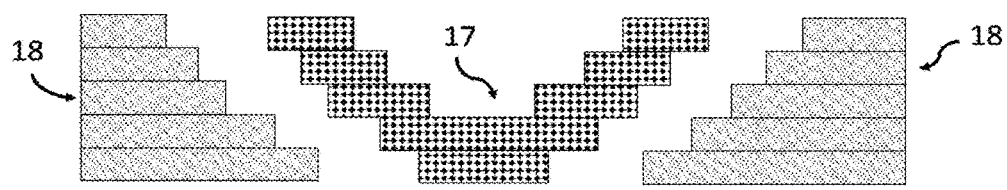
FIG. 5 is a conceptual diagram illustrating a solid freeform fabrication object obtained by removing a support (support material)

Using the supporting material liquid and removing the support (supporting material) 18 after fabrication of an object as illustrated in, for example, FIG. 5 makes it possible to obtain a solid freeform fabrication object 17 having a desired shape such as an overhang portion.

Other Processes and Other Devices

There is no specific limitation to the other optional processes and a suitable process is selected depending on a particular application. Specific examples thereof include, but are not limited to, a peeling-off process, a process of polishing a three-dimensional object, and a process of cleaning the solid freeform fabrication object.

There is no specific limitation to the other optional devices and a suitable device is selected depending on a particular application. Specific examples include, but are not limited to, a peeling-off device, a device for polishing a three-dimensional object, and a device for cleaning the solid freeform fabrication object.

Particularly, the liquid film formed in the first process does not necessarily have the intended film thickness (layer thickness) in all regions. Therefore, it is preferable to introduce a process of smoothing the liquid film formed in the first process before the second process.

The liquid film formed in the first step can be smoothed by a device configured to smooth a liquid film.

In the case of inkjet methods, non-discharging may occur. In both inkjet/dispenser methods, unevenness between dots may occur. As a result, it is difficult to obtain a laminate structure requiring high precision with such issues. To compensate this, for example, a film can be smoothed or mechanically scraped immediately after the film is formed. Alternatively, the smoothness is detected and the amount of forming the next film is adjusted to the dot level.

The hydrogel for use in the present invention is relatively soft because the target object is an internal organ. Therefore, with regard to smoothing, it is suitable to utilize mechanical smoothing immediately after a film is formed.

For example, the method of mechanically smoothing a film can be conducted by, for example, a member having a blade form or a roller form.

An example of the device for manufacturing a solid freeform fabrication object having the configuration described above is illustrated in FIG. 4.

As described above, according to the method of manufacturing a solid freeform fabrication object of the present disclosure, liquids are applied in such a manner that images can be formed layer by layer through discharging of the liquids through pores of, for example, a liquid droplet discharging system, and the first hydrogel liquid precursor and the second hydrogel liquid precursor before cured are applied to a predetermined region by predetermined amounts of application, to form a liquid film including a plurality of regions formed of hydrogel liquid precursor mixtures partially having respective ratios by amount of application. When the ratio of the first hydrogel liquid precursor and the second hydrogel liquid precursor is changed, the mass ratio is easily changed so that the amount of a cross-linking agent and a polymerizable polymer per a constant volume can be controlled. By curing and laminating such liquid films, it is possible to obtain a solid freeform fabrication object including a plurality of parts having respective physical properties of hydrogels such as compressive stress and elastic modulus.

The amount ratio between the first hydrogel liquid precursor and the second hydrogel liquid precursor is changed to form regions having respective physical properties. What matters is to control the solvent concentration difference between the hydrogels in adjacent regions within 5 percent by mass.

In a typical method of manufacturing a solid freeform fabrication object, a single or multiple curable materials are applied to different regions to form a solid freeform fabrication object having portions different compression stress and modulus of elasticity. However, in such a typical manufacturing method, obtained solid freeform fabrication objects have only properties such as compression stresses and moduli of elasticity derived from multiple curable materials. As a result, it is not possible to form a solid freeform fabrication object having properties such as continuously different compression stresses and moduli of elasticity. Furthermore, there is a known technique of applying the liquid and a second liquid and forming the liquid film including a plurality of regions having respective compressive stresses and elastic moduli after curing, to control physical properties such as compressive stress and elastic modulus. However, such a method has turned out to have a case where the shape and properties of an obtained fabrication object may change due to temporal change of the physical properties.

The method of manufacturing a solid freeform fabrication object of the present disclosure sets the moisture contents of the first hydrogel liquid precursor and the second hydrogel liquid precursor to 70 percent by mass or greater and adjusts the solvent concentration difference between adjacent regions within 5 percent by mass. This makes it possible to obtain a solid freeform fabrication object formed of hydrogels that may undergo little temporal change after manufacturing.

EMBODIMENTS

The method of manufacturing a solid freeform fabrication object and the device for manufacturing a solid freeform fabrication object are described below with reference to a specific embodiment.

First, surface data or solid data of three-dimensional form designed by three-dimensional computer-aided design (CAD) or taken in by a three-dimensional scanner or a digitizer are converted into Standard Template Library (STL) format, which is thereafter input into a lamination forming device.

Next, compression stress distribution of the three-dimensional form is measured. There is no specific limitation to methods of measuring the compression stress. For example, three-dimensional compression stress distribution data are obtained by using MR Elastography (MRE), which are thereafter input into the lamination forming device. Based on the compression stress data, the amounts of the first hydrogel liquid precursor and the second hydrogel liquid precursor to be discharged to regions corresponding to the three-dimensional data are determined. Based on the input data, the direction of the fabrication direction of three-dimensional form to be fabricated is determined. The direction is not particularly limited. Normally, the direction is chosen in which the Z direction (height direction) is the lowest.

After the direction of the three-dimensional form is determined, the projected areas in X-Y plane, X-Z plane, and Y-Z plane of the three-dimensional form are obtained to obtain a block form thereof. The thus-obtained block form is sliced in the Z direction with a thickness of a single layer. The thickness of a single layer changes depending on the material and is preferably, for example, 20 to 60 μm. When only one solid freeform fabrication object is manufactured, this block form is arranged to be placed in the center of the Z stage (i.e., table on which the object lifted down layer by layer for each layer forming is placed). In addition, when a plural of solid freeform fabrication objects are fabricated at the same time, the block forms are arranged on the Z stage. Alternatively, the block forms can be piled up. It is possible to automatically create these block forms, the slice data (contour line data), and the placement on the Z stage if materials to be used are determined.

Figure 6:
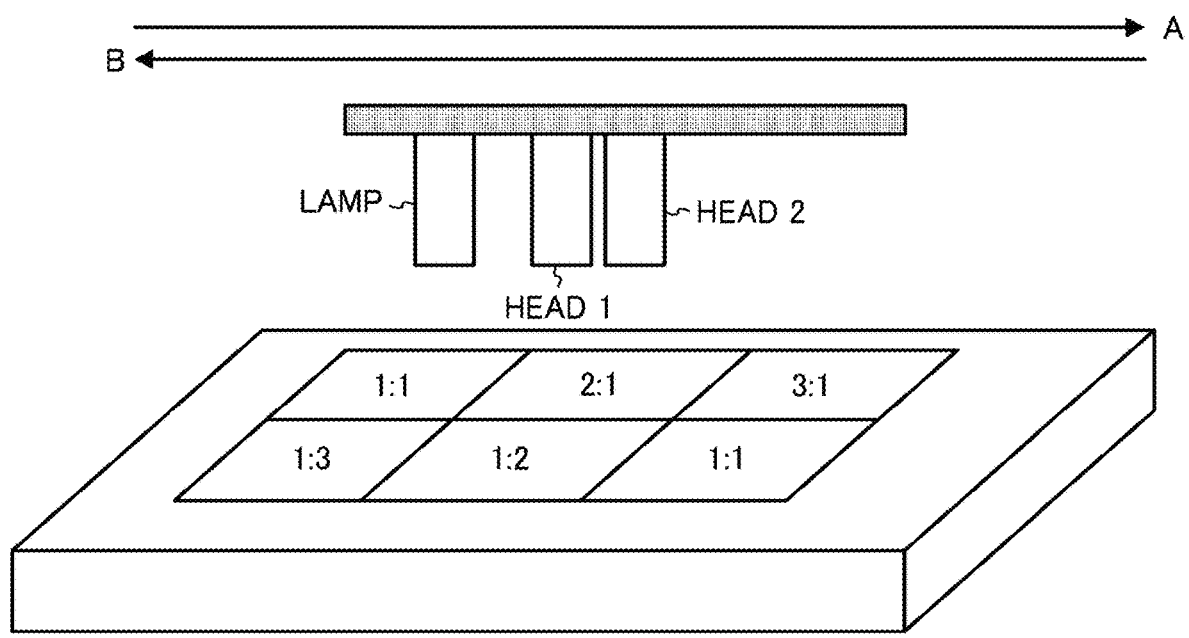
FIG. 6 is a diagram illustrating another example of the device for manufacturing a solid freeform fabrication object for use in the method of manufacturing a solid freeform fabrication object according to an embodiment of the present invention.
Figure 7:
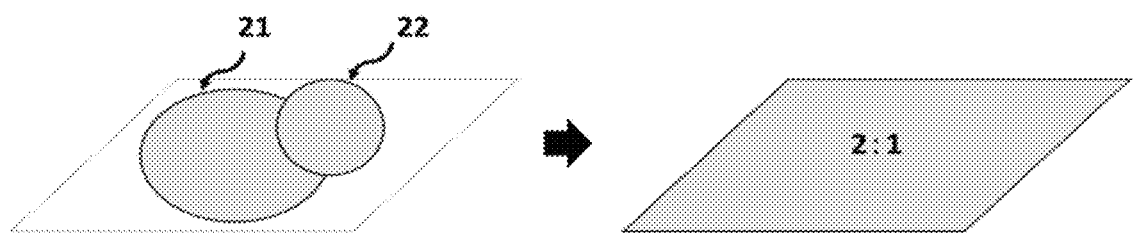
FIG. 7 is a schematic diagram illustrating an example of mixing the first hydrogel liquid precursor and the second hydrogel liquid precursor according to the liquid discharging method according to an embodiment of the present invention.

Next, fabrication step is conducted. A head 1 and a head 2 illustrated in FIG. 6 are moved bidirectionally to discharge the first hydrogel liquid precursor and the second hydrogel liquid precursor to a predetermined region at a predetermined ratio of application amount to form dots. Here, it is possible to mix the first hydrogel liquid precursor 21 and the second hydrogel liquid precursor 22 at dots to obtain a predetermined mass ratio (first hydrogel liquid precursor: second hydrogel liquid precursor) as illustrated in FIG. 7. In the example illustrated in FIG. 7, the ratio of the first hydrogel liquid precursor to the second hydrogel liquid precursor is 2:1.

Further, by forming continuous dots, it is possible to manufacture a liquid mixture film of the first hydrogel liquid precursor and the second hydrogel liquid precursor having a predetermined mass ratio (first hydrogel liquid precurso: second hydrogel liquid precursor) at a predetermined region. The liquid mixture film of the first hydrogel liquid precursor and the second hydrogel liquid precursor is irradiated with ultraviolet (UV) rays for curing. As a consequence, a hydrogel film having predetermined mass ratios (first hydrogel liquid precursor: second hydrogel liquid precursor) is formed at predetermined regions as illustrated in FIG. 6.

After a single layer of the hydrogel film is formed, the stage (FIG. 4) is lowered in an amount corresponding to the thickness of the single layer. Further, by forming continuous dots on the hydrogel film again, it is possible to manufacture a liquid mixture film of the first hydrogel liquid precursor and the second hydrogel liquid precursor having a predetermined mass ratio (first hydrogel liquid precursor:second hydrogel liquid precursor) at a predetermined region. The liquid mixture film of the first hydrogel liquid precursor and the second hydrogel liquid precursor is cured by irradiation of ultraviolet (UV) rays to form a hydrogel film. These processes are repeated to form a solid freeform fabrication object as illustrated in FIG. 8.

Figure 8:
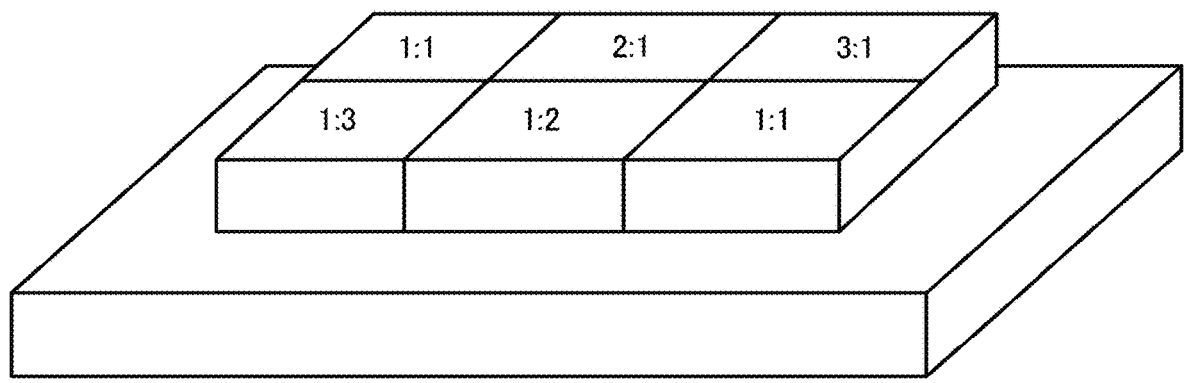
FIG. 8 is a schematic diagram illustrating an example in which the mass ratio of the first hydrogel liquid precursor and the second hydrogel liquid precursor are changed according to an embodiment of the present invention.

The thus-manufactured solid freeform fabrication object containing water as a major component and three-dimensionally produced has different mass ratios (first hydrogel liquid precursor: second hydrogel liquid precursor) between the first hydrogel liquid precursor and the second hydrogel liquid precursor in the hydrogel as illustrated in FIG. 8 and can have continuously varied physical properties such as compressive stress and elastic modulus.

Figure 4:
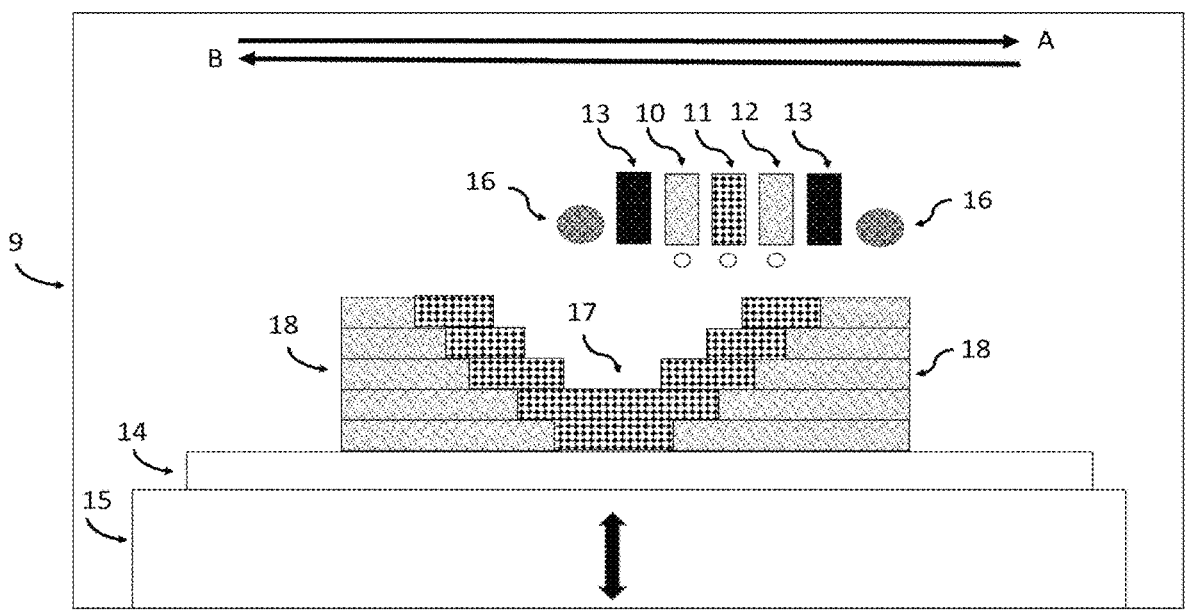
FIG. 4 is a diagram illustrating an example of the device for manufacturing a solid freeform fabrication object for use in the method of manufacturing a solid freeform fabrication object according to an embodiment of the present invention.

As illustrated in FIG. 4 illustrating an inkjet printer (as a device for fabricating a solid freeform fabrication object) 9, since UV (ultraviolet) irradiators 13 are disposed adjacent to inkjet heads 10, 11, and 12 configured to discharge the hydrogel liquid precursors, it is possible to save the time taken for a smoothing process, thereby enabling a high-performance fabrication. In addition, using UV-LED as the UV irradiator 13 is effective to reduce thermal energy discharged to a fabrication object during fabrication.

As illustrated in FIG. 4, if a smoothing member 16 is provided adjacent to the inkjet heads 10, 11, and 12 and the UV ray irradiator 13, smoothing layer by layer and controlling the layer thickness are possible, which is very useful to the fabrication in the present invention.

Liquid Set for Solid Freeform Fabrication

A liquid set for solid freeform fabrication of the present disclosure includes the first hydrogel liquid precursor and the second hydrogel liquid precursor and may further include other optional components. Examples of the other optional components include, but are not limited to, a hydrogel liquid precursor compositionally different from the first and second hydrogel liquid precursors, a diluting fluid for the hydrogel liquid precursors, a liquid containing a polymerization initiator, and a liquid containing a chelate agent.

The first hydrogel liquid precursor preferably includes a water-containing solvent and a polymerizable monomer as the curable material, more preferably a mineral, and furthermore preferably a polymerization initiator.

As the polymerizable monomer, the same polymerizable monomer as in the hydrogel liquid precursor in the method of manufacturing a solid freeform fabrication object can be used.

The first hydrogel liquid precursor has a moisture content of 70 percent by mass or greater.

The second hydrogel liquid precursor is compositionally different from the first hydrogel liquid precursor, has a solvent concentration difference of within 5 percent by mass from the first hydrogel liquid precursor, and has a moisture content of 70 percent by mass or greater. In addition, the second hydrogel liquid precursor preferably includes at least one of a cross-linking agent and a mineral and more preferably a polymerization initiator.

As the cross-linking agent, the same cross-linking agent as in the first hydrogel liquid precursor for use in the method of manufacturing a solid freeform fabrication object.

The first hydrogel liquid precursor and the second hydrogel liquid precursor both contain multi-functional polymerizable monomers (cross-linking agent). It is preferable that the type and/or the content of the multi-functional polymerizable monomer are not identical in the first hydrogel liquid precursor and the second hydrogel liquid precursor.

As the mineral, the same mineral as in the first hydrogel liquid precursor in the method of manufacturing a solid freeform fabrication object can be used.

As the polymerization initiator in the first hydrogel liquid precursor and the second hydrogel liquid precursor, the same polymerization initiator as in the first hydrogel liquid precursor of the method of fabricating a solid freeform fabrication object can be used.

The present disclosure relates to the solid freeform fabrication object of the following 1 and also includes the following 2 to 19 as embodiments.

1. A solid freeform fabrication object includes a plurality of parts formed of hydrogels having respective physical properties, wherein the hydrogels having respective physical properties, each having a moisture content of 70 percent by mass or greater, wherein a solvent concentration difference between the hydrogel constituting adjacent parts of the plurality of parts is 5 percent by mass or less.

2. The solid freeform fabrication object according to 1 mentioned above, wherein each of the hydrogels having respective physical properties contains a water-containing solvent, a polymer, and a mineral.

3. The solid freeform fabrication object according to 1 or 2 mentioned above, wherein each of the hydrogels contains water and an organic solvent as solvents.

4. The solid freeform fabrication object according to any one of 1 to 3 mentioned above, wherein each of the hydrogels has a moisture content of 80 percent by mass or greater.

5. A method of manufacturing a solid freeform fabrication object includes applying a plurality of hydrogel liquid precursors to form a liquid film while controlling an application position and an application amount of the plurality of hydrogel liquid precursors, each of the plurality of hydrogel liquid precursors having a moisture content of 70 percent by mass or greater and having a solvent concentration difference of within 5 percent by mass from each other, curing the liquid film to obtain a cured film including a plurality of regions formed of hydrogels having respective physical properties, and laminating the cured film.

6. The method according to 5 mentioned above, wherein the applying includes repeating applying the plurality of hydrogel liquid precursors at a same position with an amount ratio in a same plane while changing at least one of the application position and the amount ratio to produce a plurality of regions formed of hydrogel precursor mixtures having respective application amount ratios in the liquid film forming a same layer.
7. The three-dimensional object producing method according to 5 or 6 mentioned above, wherein the plurality of hydrogel liquid precursors are applied according to a liquid droplet discharging method.
8. The method according to any one of 5 to 7 mentioned above, wherein the application amounts of the plurality of hydrogel liquid precursors are adjusted by changing a volume of a liquid droplet to be applied.
9. The method according to any one of 5 to 7 mentioned above, wherein the application amounts of the plurality of hydrogel liquid precursors are adjusted by changing a number of liquid droplets to be applied.
10. The method according to any one of 5 to 9 mentioned above, wherein each of the plurality of hydrogel liquid precursors contains a water-containing solvent, a polymerizable monomer, and a mineral.
11. The method according to any one of 5 to 10 mentioned above, wherein each of the plurality of hydrogel liquid precursors contains water and an organic solvent as solvents.
12. The method according to any one of claims 5 to 11, wherein each of the plurality of hydrogel liquid precursors contains a multi-functional polymerizable monomer as a polymerizable monomer.
13. A liquid set for solid freeform fabrication contains a first hydrogel liquid precursor containing a water-containing solvent, a polymerizable monomer, and a mineral, and having a moisture content of 70 percent by mass or greater and a second hydrogel liquid precursor compositionally different from the first hydrogel liquid precursor, having a solvent concentration difference of within 5 percent by mass of the first hydrogel liquid precursor, and having a moisture content of 70 percent by mass or greater.
14. The liquid set according to 13 mentioned above, wherein the first hydrogel liquid precursor and the second hydrogel liquid precursor contain respective multi-functional polymerizable monomers with at least one of types or proportions of the respective multi-functional polymerizable monomers different from each other.
15. A method of manufacturing a solid freeform fabrication includes applying the first hydrogel liquid precursor and the second hydrogel liquid precursor of the liquid set of 13 or 14 mentioned above to form a liquid film and curing the liquid film formed in the applying.
16. A device for manufacturing a solid freeform fabrication object includes a liquid applying device configured to apply the liquid set for solid freeform fabrication of 13 or 14 mentioned above to form a liquid film and a film curing device configured to cure the liquid film.
17. The device according to 16 mentioned above, wherein the liquid applying device discharges the liquid set in a liquid droplet discharging method.
18. The device according to 16 or 17 mentioned above, wherein the film curing device cures the liquid film with a UV-LED.
19. The device according to any one of 16 to 18 mentioned above, further comprising a smoothing device configured to smooth the liquid film.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.
Preparation of Hydrogel Liquid Precursor 1
Pure water was prepared by evacuating deionized water for 30 minutes.
While stirring 70.0 parts by mass of pure water, 5.72 parts by mass of synthesized hectorite (laponite XLG, manufactured by Rockwood Additives Ltd.) having a composition of $Na^+_{0.66}[(Si_8Mg_{5.35}Li_{0.66})O_{20}(OH)_4]^-_{0.66}$ as laminate clay mineral was slowly added to the pure water followed by stirring to prepare a first liquid dispersion. Next, 0.29 parts by mass of etidronic acid (manufactured by Tokyo Chemical Industry Co. Ltd.) as the dispersant for the synthesized hectorite was added to the first liquid dispersion to obtain a second liquid dispersion.
Next, to the second liquid dispersion, 7.50 parts by mass of dimethyl acrylamide (DMAA, manufactured by Tokyo Chemical Industry Co., Ltd.) from which a polymerization inhibitor was removed by passing through active alumina column was added as a curable material. Furthermore, 0.07 percent by mass of N,N'-methylene bisacrylamide (MBAA, manufactured by Tokyo Chemical Industry Co. Ltd.) was added as a cross-linking agent. Glycerin (manufactured by Sakamoto Yakuhin Kogyo Co., Ltd.) (5.0 parts by mass) was admixed as a drying retardant in a form of an organic solvent.
Next, 0.172 parts by mass of N,N,N',N'-tetramethyl ethylenediamine (TEMED, manufactured by Tokyo Chemical Industry Co., Ltd.) was added as a polymerization accelerator and thereafter stirred and mixed. Subsequent to the stirring and mixing, the resultant was evacuated for ten minutes. Subsequently, the resultant was filtrated to remove, for example, impurities, to obtain a homogeneous hydrogel liquid precursor 1.
Preparation of Hydrogel Liquid Precursors 2 to 4
Hydrogel liquid precursors 2 to 4 were prepared in the same manner as in the preparation of the hydrogel liquid precursor 1 except that the prescription was changed shown in Table 1-1. The values relating to the materials shown in Table 1-1 are represented in the unit of part by mass.

TABLE 1-1

| Material (part by mass) | Hydrogel liquid precursor 1 | Hydrogel liquid precursor 2 | Hydrogel liquid precursor 3 | Hydrogel liquid precursor 4 |
|---|---|---|---|---|
| Pure water | 70.0 | 70.0 | 70.0 | 70.0 |
| Glycerin | 5.0 | 5.0 | 5.0 | 5.0 |
| Synthetic hectorite | 5.72 | 4.58 | 3.43 | 2.86 |
| Etidronic acid | 0.29 | 0.23 | 0.17 | 0.14 |
| DMAA | 7.50 | 7.50 | 7.50 | 7.50 |
| MBAA | 0.07 | 0.07 | 0.07 | 0.07 |
| TEMED | 0.172 | 0.140 | 0.100 | 0.090 |
| Total amount | 88.8 | 87.5 | 86.3 | 85.7 |
| Moisture content (%) | 78.9 | 80.0 | 81.1 | 81.7 |
| Solvent concentration (%) | 84.5 | 85.7 | 86.9 | 87.6 |

Preparation of Hydrogel Liquid Precursor 5
Pure water was prepared by evacuating deionized water for 30 minutes.
While stirring 70.0 parts by mass of pure water, 5.72 parts by mass of synthesized hectorite (laponite XLG, manufactured by Rockwood Additives Ltd.) having a composition of $Na^+_{0.66}[(Si_8Mg_{5.35}Li_{0.66})O_{20}(OH)_4]^-_{0.66}$ as laminate clay mineral was slowly added to the pure water followed by stirring to prepare a liquid dispersion. Next, 0.29 percent by mass of etidronic acid (manufactured by Tokyo Chemical Industry Co. Ltd.) as the dispersant for the synthesized hectorite was added to the first liquid dispersion to obtain a second liquid dispersion.

Next, to the second liquid dispersion, 14.90 parts by mass of dimethyl acrylamide (DMAA, manufactured by Tokyo Chemical Industry Co., Ltd.) from which a polymerization inhibitor was removed by passing through active alumina column was added as the curable material. Furthermore, 0.14 parts by mass of N,N'-methylene bisacrylamide (MBAA, manufactured by Tokyo Chemical Industry Co. Ltd.) was added as a cross-linking agent. Further, 5.0 parts by mass of glycerin (manufactured by Sakamoto Yakuhin Kogyo Co., Ltd.) was admixed.

Next, 0.172 parts by mass of N,N,N',N'-tetramethyl ethylenediamine (TEMED, manufactured by Tokyo Chemical Industry Co., Ltd.) was added as a polymerization accelerator and thereafter stirred and mixed. Subsequent to the stirring and mixing, the resultant was evacuated for ten minutes. Subsequently, the resultant was filtrated to remove, for example, impurities, to obtain a homogeneous hydrogel liquid precursor 5.

Preparation of Hydrogel Liquid Precursors 6 to 8

Hydrogel liquid precursors 6 to 8 were prepared in the same manner as in Preparation of Hydrogel Liquid Precursor 5 except that the prescription was changed shown in Table 1-2. The values relating to the materials shown in Table 1-2 are represented in the unit of part by mass.

TABLE 1-2

| Material (part by mass) | Hydrogel liquid precursor 5 | Hydrogel liquid precursor 6 | Hydrogel liquid precursor 7 | Hydrogel liquid precursor 8 |
|---|---|---|---|---|
| Pure water | 70.0 | 78.3 | 80.7 | 83.4 |
| Glycerin | 5.0 | 5.0 | 3.0 | 2.5 |
| Synthetic hectorite | 5.72 | 4.58 | 3.43 | 2.86 |
| Etidronic acid | 0.29 | 0.23 | 0.17 | 0.15 |
| DM AA | 14.90 | 11.90 | 8.90 | 7.50 |
| MB AA | 0.14 | 0.11 | 0.08 | 0.07 |
| TEMED | 0.172 | 0.140 | 0.100 | 0.090 |
| Total amount | 96.2 | 100.3 | 96.4 | 96.6 |
| Moisture content (%) | 72.7 | 78.1 | 83.7 | 86.4 |
| Solvent concentration (%) | 77.9 | 83.1 | 86.8 | 89.0 |

Preparation of Curing Liquid

Pure water was prepared by evacuating deionized water for 30 minutes.

First, to the pure water (98 parts by mass) under stirring, sodium peroxodisulfate (manufactured by FUJIFILM Wako Pure Chemical Corporation) (2 parts by mass) was added, and subsequently stirred and mixed. After complete dissolution, the resulting material was filtrated to remove, for example, impurities, to obtain a curing liquid.

Example 1

A total of 10 parts by mass of the hydrogel liquid precursor 2 and 1.1 parts by mass of the curing liquid were stirred and mixed and cured for two hours while being sealed in a styrol rectangular case type 1 (manufactured by As One Corporation), to produce an internal hydrogel 23 (FIG. 9).

Figure 9A:
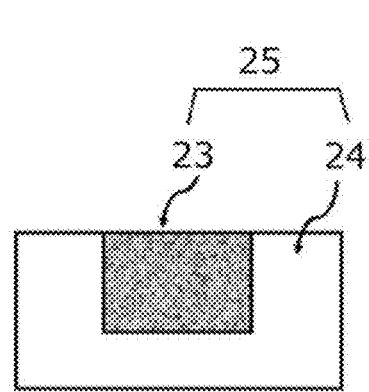
FIGS. 9A and 9B are schematic diagrams illustrating the hydrogel structure manufactured in Example 1 described later.
Figure 9B:
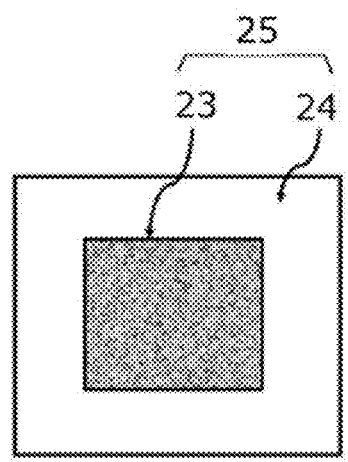

A stirred/mixed product of the hydrogel liquid precursor 1 (40 parts by mass) and the curing liquid (4.4 parts by mass) was prepared and cured for 2 hours while being sealed in a styrol rectangular case type 3 (manufactured by As One Corporation) together with the internal hydrogel 23, to prepare an external hydrogel 24. As a result, a hydrogel structure 1 (25) enclosing the internal hydrogel 23 was prepared as illustrated in FIGS. 9A and 9B (FIG. 9).

Example 2

A hydrogel structure 2 was prepared in the same manner as in Example 1, except that the hydrogel liquid precursor 2 was changed to the hydrogel liquid precursor 3.

Example 3

A hydrogel structure 3 was prepared in the same manner as in Example 1, except that the hydrogel liquid precursor 2 was changed to the hydrogel liquid precursor 4.

Comparative Example 1

A hydrogel structure 4 was prepared in the same manner as in Example 1, except that the hydrogel liquid precursor 2 was changed to the hydrogel liquid precursor 6 and the hydrogel liquid precursor 1 was changed to the hydrogel liquid precursor 5.

Comparative Example 2

A hydrogel structure 5 was prepared in the same manner as in Comparative Example 1, except that the hydrogel liquid precursor 6 was changed to the hydrogel liquid precursor 7.

Comparative Example 3

A hydrogel structure 6 was prepared in the same manner as in Comparative Example 1, except that the hydrogel liquid precursor 6 was changed to the hydrogel liquid precursor 8.

Evaluation

Young's moduli of the external hydrogel 23 and the internal hydrogel 24 of the hydrogel structures 1 to 6 prepared as described above were measured. The results are shown in Table 2.

The Young's moduli were measured using a flexibility measuring system (manufactured by Horiuchi Electronics Co., Ltd.).

The hydrogel structures were evaluated immediately after the preparation thereof and after they were stored for three days.

For storage, the hydrogels were stored while being sealed in LAMIZIP (manufactured by Seisan Nipponsha Ltd.) for prevention of drying of the hydrogels. The shapes of the hydrogel structures were visually checked. The results are shown in Table 2.

Result

As seen in Table 2, in Examples 1 to 3 (in which the moisture content of the hydrogels was 70 percent by mass or greater and the solvent concentration difference between adjacent parts was within 5 percent by mass), little or no change of the physical property (Young's modulus) was present and also, the shape did not change over time.

On the other hand, in Comparative Examples 1 to 3 (in which the solvent concentration difference between adjacent parts was greater than 5 percent by mass), the physical property (Young's modulus) underwent a great change due to transfer of the solvent and the parts produced with the hydrogel liquid precursors 6 to 8 underwent a great volume shrinkage.

TABLE 2

| Hydrogel structure No. | *whether internal or external hydrogel | Type of hydrogel liquid precursor | Young's modulus (kPa) (Immediately after production) | Young's modulus (kPa) (3 days after production) | Shape change |
|---|---|---|---|---|---|
| Ex. 1 Hydrogel structure 1 | External | Hydrogel liquid precursor 1 | 37.3 | — | No change |
| | Internal | Hydrogel liquid precursor 2 | 15.0 | 15.1 | |
| Ex. 2 Hydrogel structure 2 | External | Hydrogel liquid precursor 1 | 37.3 | — | No change |
| | Internal | Hydrogel liquid precursor 3 | 10.3 | 10.4 | |
| Ex. 3 Hydrogel structure 3 | External | Hydrogel liquid precursor 1 | 37.3 | — | No change |
| | Internal | Hydrogel liquid precursor 4 | 8.6 | 8.8 | |
| Comp. Ex. 1 Hydrogel structure 4 | External | Hydrogel liquid precursor 5 | 66.8 | — | Volume shrinkage |
| | Internal | Hydrogel liquid precursor 6 | 31.2 | 65.5 | |
| Comp. Ex. 2 Hydrogel structure 5 | External | Hydrogel liquid precursor 5 | 66.8 | — | Volume shrinkage |
| | Internal | Hydrogel liquid precursor 7 | 9.1 | 64.8 | |
| Comp. Ex. 3 Hydrogel structure 6 | External | Hydrogel liquid precursor 5 | 66.8 | — | Volume shrinkage |
| | Internal | Hydrogel liquid precursor 8 | 4.8 | 63.6 | |

Preparation of Hydrogel Liquid Precursor 9

Pure water was prepared by evacuating deionized water for 30 minutes.

While stirring 75.0 parts by mass of pure water, 5.72 parts by mass of synthesized hectorite (laponite XLG, manufactured by Rockwood Additives Ltd.) having a composition of $Na^+_{0.66}[(Si_8Mg_{5.35}Li_{0.66})O_{20}(OH)_4]^-_{0.66}$ as laminate clay mineral was slowly added to the pure water followed by stirring to prepare a liquid dispersion. Next, 0.29 parts by mass of etidronic acid (manufactured by Tokyo Chemical Industry Co. Ltd.) as the dispersant for the synthesized hectorite was added to the first liquid dispersion to obtain a second liquid dispersion.

Next, to the second liquid dispersion, 10.0 parts by mass of acryloylmorpholine (ACMO, manufactured by KJ Chemicals Co., Ltd.) from which a polymerization inhibitor was removed by passing through active alumina column and 1.00 part by mass of dimethyl acrylamide (DMAA, manufactured by Tokyo Chemical Industry Co., Ltd.) from which a polymerization inhibitor was removed by passing through active alumina column were added as the curable material. Further, 0.10 parts by mass of N,N'-methylene bisacrylamide (MBAA, manufactured by Tokyo Chemical Industry Co., Ltd.) as a cross-linking agent and 0.51 parts by mass of LS106 (manufactured by Kao Corporation) as a surfactant were admixed.

Next, after 0.172 parts by mass of a polymerization promoter {N,N,N',N'-tetramethylethylene dimaine (TEMED, manufactured by Tokyo Chemical Industry Co. Ltd.)} and 0.60 parts by mass of photopolymerization initiator {4 percent by mass of IRGACURE 184 (manufactured by BASF GmbH) and 96 percent by mass of methanol} were added followed by mixing and stirring. Subsequent to the stirring and mixing, the resulting material was evacuated for ten minutes. Subsequently, the resulting material was filtrated to remove, for example, impurities, to obtain a homogeneous hydrogel liquid precursor 9.

Preparation of Hydrogel Liquid Precursors 10 to 14

Hydrogel liquid precursors 10 to 14 were prepared in the same manner as in Preparation of Hydrogel Liquid Precursor 9 except that the prescription was changed as shown in Table 3. The values relating to the materials shown in Table 3 are represented in the unit of part by mass.

TABLE 3

| Material (part by mass) | Hydrogel liquid precursor 9 | Hydrogel liquid precursor 10 | Hydrogel liquid precursor 11 | Hydrogel liquid precursor 12 | Hydrogel liquid precursor 13 | Hydrogel liquid precursor 14 |
|---|---|---|---|---|---|---|
| Pure water | 75.0 | 75.0 | 70.0 | 70.0 | 70.0 | 81.5 |
| Glycerin | 0.0 | 0.0 | 5.0 | 5.0 | 5.0 | 3.0 |
| Synthetic hectorite | 5.72 | 3.43 | 5.72 | 3.43 | 5.72 | 3.22 |
| Etidronic acid | 0.29 | 0.17 | 0.29 | 0.17 | 0.29 | 0.16 |
| ACMO | 10.0 | 10.0 | 10.0 | 10.0 | 24.7 | 4.62 |

TABLE 3-continued

| Material (part by mass) | Hydrogel liquid precursor 9 | Hydrogel liquid precursor 10 | Hydrogel liquid precursor 11 | Hydrogel liquid precursor 12 | Hydrogel liquid precursor 13 | Hydrogel liquid precursor 14 |
|---|---|---|---|---|---|---|
| DMAA | 1.00 | 1.00 | 1.00 | 1.00 | 5.11 | 0.96 |
| MBAA | 0.10 | 0.10 | 0.10 | 0.10 | 0.25 | 0.04 |
| TEMED | 0.172 | 0.100 | 0.172 | 0.100 | 0.172 | 0.100 |
| LSI06 | 0.51 | 0.51 | 0.51 | 0.51 | 0.51 | 0.31 |
| Irgacure184* | 0.60 | 0.60 | 0.60 | 0.60 | 0.60 | 0.60 |
| Total amount | 93.4 | 90.9 | 93.4 | 90.9 | 112.4 | 94.5 |
| Moisture content (%) | 80.3 | 82.5 | 75.0 | 77.0 | 62.3 | 86.2 |
| Solvent concentration (%) | 80.3 | 82.5 | 80.3 | 82.5 | 66.8 | 89.4 |

*4% by mass IRGACURE 184 methanol solution

Example 4

By using the hydrogel liquid precursor 9 and the hydrogel liquid precursor 10 prepared as described above, a solid freeform fabrication object including a plurality of regions having respective physical properties was manufactured in the following manner.

The inkjet heads (MH5420, manufactured by Ricoh Industry Company, Ltd.) were filled with the hydrogel liquid precursor 9 and the hydrogel liquid precursor 10 and discharged them at 300 dpi×300 dpi. A hydrogel structure as a solid freeform fabrication object was manufactured by changing the mass ratio (hydrogel liquid precursor 9:hydrogel liquid precursor 10) as illustrated in FIG. 6 while controlling the volume of a liquid droplet to be discharged. FIG. 6 is a diagram illustrating the mixing ratio distribution in which the volume of the droplets of the hydrogel liquid precursor 9 and the hydrogel liquid precursor 10 in a single region in the solid freeform fabrication object (hydrogel structure).

Specifically, four heads were used for each of the first hydrogel liquid precursor and the second hydrogel liquid precursor, to discharge the hydrogel liquid precursor 9 and the hydrogel liquid precursor 10. The total amount of the liquid applied to the single region was controlled to be 144 pL.

For example, the liquid volume was changed in such a manner that the ratio of the volume of the hydrogel liquid precursor 9 and the volume of the hydrogel liquid precursor 10 was 72 pL:72 pL (1:1), 36 pL:108 pL (1:3), and 108 pL:36 pL (3:1) to form a film including a hydrogel. Thereafter, the film was cured by light emitted by an ultraviolet ray irradiator (SPOT CURE SP5-250DB, manufactured by USHIO INC.) in a light amount of 350 mJ/cm². A hundred layers of films were formed in the same manner and cured, to manufacture a solid freeform fabrication object formed of the hydrogel.

Two such solid freeform fabrication objects were manufactured. A part having a size of 30 mm in depth, 30 mm in width, and 10 mm in height was cut out from one of the two immediately after manufacturing and a part having the same size was cut out from the other after stored in a sealed state for three days.

Comparative Example 4

Instead of the hydrogel liquid precursor 9 and the hydrogel liquid precursor 10 of Example 4, the hydrogel liquid precursor 13 and the hydrogel liquid precursor 14 were used, to manufacture the same solid freeform fabrication objects as in Example 4. Parts were likewise cut out in the same manner as in Example 4, to be used for measurement of compressive stress.

Evaluation

A physical property (compressive stress at 70 percent compression) of the solid freeform fabrication object manufactured as illustrated in FIG. 6 was measured.

The parts cut out in Example 4 and Comparative Example 4 were used as a sample for measurement of compressive stress.

Specifically, compressive stress at 70 percent compression was measured by sandwiching the solid freeform fabrication object between compression jigs for load cells 1 kN and 1 kN (circular columnar metal having a diameter of 100 mm) of a universal tester (manufactured by Shimadzu Corporation, AG-I), recording the stress corresponding to compression applied to the load cells in a computer, and plotting the stress corresponding to displacement.

Result

The results are shown in Table 4.

The sample having a volume ratio of 1:1 was cut out from the upper left portion illustrated in FIG. 6.

As seen in the results shown in Table 4, the properties of the hydrogel to be fabricated can be controlled by adjusting the volume of the two hydrogel liquid precursors and changing the ratio to form a mixed film.

Further, as seen in the result of Table 4, in Example 4 using the hydrogel liquid precursor 9 and the hydrogel liquid precursor 10 (with a moisture content of hydrogels of 70 percent by mass or greater and within a solvent concentration difference of 5 percent by mass between adjacent parts), little or no change of the physical property (compressive stress) was present over time.

On the other hand, in Comparative Example 4 using the hydrogel liquid precursor 13 and the hydrogel liquid precursor 14 (with a solvent concentration difference of 5 percent by mass or greater between adjacent parts), the physical property (compressive stress) underwent a great change due to transfer of the solvents.

TABLE 4

| | Ratio by volume | Compressive stress (kPa) | |
| --- | --- | --- | --- |
| | | (Immediately after production) | (3 days after production) |
| Ex. 4 | 1:1 | 36 | 37 |
| | 3:1 | 45 | 45 |
| | 1:3 | 31 | 32 |
| Comp. Ex. 4 | 1:1 | 101 | 175 |
| | 3:1 | 187 | 180 |
| | 1:3 | 30 | 130 |

Example 5

Using the hydrogel liquid precursor 11 and the hydrogel liquid precursor 12 prepared as described above, a solid freeform fabrication object including a plurality of regions having respective physical properties was manufactured as described above.

The inkjet heads (MH5420, manufactured by Ricoh Industry Company, Ltd.) were filled with the hydrogel liquid precursor 11 and the hydrogel liquid precursor 12 and discharged them at 300 dpi×300 dpi. A hydrogel structure as a solid freeform fabrication object was manufactured by changing the mass ratio (hydrogel liquid precursor 11:hydrogel liquid precursor 12) as illustrated in FIG. 6 while controlling the number of liquid droplets to be discharged. FIG. 6 is a diagram illustrating the mixing ratio distribution in which the volume of the droplets of the hydrogel liquid precursor 11 and the hydrogel liquid precursor 12 in a single region in the solid freeform fabrication object (hydrogel structure).

Specifically, four heads were used for each of the first hydrogel liquid precursor and the second hydrogel liquid precursor, to discharge the hydrogel liquid precursor 11 and the hydrogel liquid precursor 12. The total amount of the liquid applied to the single region was controlled to be 144 pL. The volume of a single droplet was determined to be 36 pL and four droplets were discharged for the single region.

For example, the number of liquid droplets was changed in such a manner that the ratio of the volume of the hydrogel liquid precursor 11 and the volume of the hydrogel liquid precursor 12 was 1:1, 1:3, and 3:1 to form a film including a hydrogel. Thereafter, the film was cured by light emitted by an ultraviolet ray irradiator (SPOT CURE SP5-250DB, manufactured by USHIO INC.) in a light amount of 350 mJ/cm$^2$. A hundred layers of films were formed in the same manner and cured, to manufacture a solid freeform fabrication object formed of the hydrogel.

Two such solid freeform fabrication objects were manufactured in the same manner as in Example 4. A part having a size of 30 mm in depth, 30 mm in width, and 10 mm in height was cut out from one of the two immediately after manufacturing and a part having the same size was cut out from the other after stored in a sealed state for three days.

Evaluation

Compressive stress at 70 percent compression was measured in the same manner as in Example 4.

Evaluation was made immediately after and three days after manufacturing of the objects.

Result

The results are shown in Table 5.

The properties of the hydrogel to be fabricated can be controlled by adjusting the number of liquid droplets of the two hydrogel liquid precursors and changing the ratio to form a mixed film. Further, as seen in the result of Table 5, in Example 5 using the hydrogel liquid precursor 11 and the hydrogel liquid precursor 12 (with a moisture content of hydrogels of 70 percent by mass or greater and within a solvent concentration difference of 5 percent by mass between adjacent parts), little or no change of the physical property (compressive stress) was present over time.

TABLE 5

| | Ratio by number of liquid droplets | Compressive stress (kPa) | |
| --- | --- | --- | --- |
| | | (Immediately after production) | (3 days after production) |
| Ex. 5 | 1:1 | 170 | 171 |
| | 3:1 | 201 | 200 |
| | 1:3 | 142 | 144 |

Preparation of Hydrogel Liquid Precursor 15

Pure water was prepared by evacuating deionized water for 30 minutes.

While stirring 75.0 parts by mass of pure water, 5.72 parts by mass of synthesized hectorite (laponite XLG, manufactured by Rockwood Additives Ltd.) having a composition of Na$^+$$_{0.66}$[(Si$_8$Mg$_{5.35}$Li$_{0.66}$)O$_{20}$(OH)$_4$]$^-$$_{0.66}$ as laminate clay mineral was slowly added to the pure water followed by stirring to prepare a liquid dispersion. Next, 0.29 parts by mass of etidronic acid (manufactured by Tokyo Chemical Industry Co. Ltd.) as the dispersant for the synthesized hectorite was added to the first liquid dispersion to obtain a second liquid dispersion.

Next, to the second liquid dispersion, 10.0 parts by mass of acryloylmorpholine (ACMO, manufactured by KJ Chemicals Co., Ltd.) from which a polymerization inhibitor was removed by passing through active alumina column and 1.0 part by mass of dimethyl acrylamide (DMAA, manufactured by Tokyo Chemical Industry Co., Ltd.) from which a polymerization inhibitor was removed by passing through active alumina column were added as the curable material. Further, 0.1 parts by mass of N,N'-methylene bisacrylamide (MBAA, manufactured by Tokyo Chemical Industry Co., Ltd.) as a cross-linking agent and 0.51 parts by mass of LS106 (manufactured by Kao Corporation) as a surfactant and 0.6 parts by mass of a white dispersion (AC-RW7, manufactured by Dainichiseika Color & Chemicals Mfg. Co., Ltd.) were admixed.

Next, after 0.172 parts by mass of a polymerization promoter {N,N,N',N'-tetramethylethylene dimaine (TEMED, manufactured by Tokyo Chemical Industry Co. Ltd.)} and 0.60 parts by mass of photopolymerization initiator {4 percent by mass of IRGACURE 184 (manufactured by BASF GmbH) and 96 percent by mass of methanol} were added followed by mixing and stirring. Subsequent to the stirring and mixing, the resultant was evacuated for ten minutes. Subsequently, the resultant was filtrated to remove, for example, impurities, to obtain a homogeneous hydrogel liquid precursor 15.

Preparation of Hydrogel Liquid Precursor 16

Pure water was prepared by evacuating deionized water for 30 minutes.

While stirring 70.0 parts by mass of pure water, 5.72 parts by mass of synthesized hectorite (laponite XLG, manufactured by Rockwood Additives Ltd.) having a composition of Na$^+$$_{0.66}$[(Si$_8$Mg$_{5.35}$Li$_{0.66}$)O$_{20}$(OH)$_4$]$^-$$_{0.66}$ as laminate clay mineral was slowly added to the pure water followed by stirring to prepare a liquid dispersion. Next, 0.29 parts by mass of etidronic acid (manufactured by Tokyo Chemical Industry Co. Ltd.) as the dispersant for the synthesized hectorite was added to the first liquid dispersion to obtain a second liquid dispersion.

Next, to the second liquid dispersion, 10.0 parts by mass of acryloylmorpholine (ACMO, manufactured by KJ Chemicals Co., Ltd.) from which a polymerization inhibitor was removed by passing through active alumina column and 1.0 part by mass of dimethyl acrylamide (DMAA, manufactured by Tokyo Chemical Industry Co., Ltd.) from which a polymerization inhibitor was removed by passing through active alumina column were added as the curable material. Further, 0.1 parts by mass of N,N'-methylene bisacrylamide (MBAA, manufactured by Tokyo Chemical Industry Co., Ltd.) as a cross-linking agent and 0.51 parts by mass of LS106 (manufactured by Kao Corporation) as a surfactant and 0.6 parts by mass of a white dispersion (AC-RW7, manufactured by Dainichiseika Color & Chemicals Mfg. Co., Ltd.) were admixed. Further, 5.0 parts by mass of glycerin (manufactured by Sakamoto Yakuhin Kogyo Co., Ltd.) was admixed.

Next, after 0.172 parts by mass of a polymerization promoter {N,N,N',N'-tetramethylethylene dimaine (TEMED, manufactured by Tokyo Chemical Industry Co. Ltd.)} and 0.60 parts by mass of photopolymerization initiator {4 percent by mass of IRGACURE 184 (manufactured by BASF GmbH) and 96 percent by mass of methanol} were added followed by mixing and stirring. Subsequent to the stirring and mixing, the resultant was evacuated for ten minutes. Subsequently, the resultant was filtrated to remove, for example, impurities, to obtain a homogeneous hydrogel liquid precursor 16.

TABLE 6

| Material (part by mass) | Hydrogel liquid precursor 15 | Hydrogel liquid precursor 16 |
| --- | --- | --- |
| Pure water | 75.0 | 70.0 |
| Glycerin | 0 | 5.0 |
| Synthetic hectorite | 5.72 | 5.72 |
| Etidronic acid | 0.29 | 0.29 |
| ACMO | 10.0 | 10.0 |
| DMAA | 1.0 | 1.0 |
| MBAA | 0.1 | 0.1 |
| TEMED | 0.172 | 0.172 |
| LSI06 | 0.51 | 0.51 |
| AC-RW7 | 0.6 | 0.6 |
| Irgacure184* | 0.60 | 0.60 |
| Total amount | 94.0 | 94.0 |
| Moisture content (%) | 79.8 | 74.5 |
| Solvent concentration (%) | 79.8 | 79.8 |

*4 percent by mass IRGACURE 184 methanol solution

Preparation of Liquid Material for Forming Support

A total of 58.0 parts by mass of 1-dodecanol (manufactured by Tokyo Chemical Industry Co., Ltd.), 48.0 parts by mass of stearyl acrylate (manufactured by Tokyo Chemical Industry Co., Ltd.), and 4.0 parts by mass of IRGACURE 819 (manufactured by BASF GmbH) were stirred, mixed, and dissolved. Thereafter, the mixture was filtered to remove impurities followed by vacuum degassing for ten minutes to obtain a homogenized liquid material for forming a support.

Example 6

The four ink heads (GEN4, manufactured by Ricoh Industry Company, Ltd.) of the 3D printer employing an inkjet method as illustrated in FIG. 4 were filled with the hydrogel liquid precursor 15, the hydrogel liquid precursor 13, and the liquid material for forming a support and jetted these liquid materials to form a layer.

Kidney model data prepared in advance was converted into 3D printing data to fabricate a kidney model. The ureter part was formed with the hydrogel liquid precursor 15, the renal parenchyma (normal part) was formed with the hydrogel liquid precursor 10, a tumor part was formed by mixing the hydrogel liquid precursor 15 and the hydrogel liquid precursor 10 at a ratio by volume of 1:1 to form a mixed film, and a support for these was fabricated using a liquid material for forming a support.

The hydrogel liquid precursor 15, the hydrogel liquid precursor 10, and the liquid material for forming a support were cured by irradiation at a light intensity of 350 mJ/cm$^2$ using an ultraviolet irradiator (manufactured by SPOT CURE SP5-250DB, Ushio Inc.) to form the kidney model and the support.

Figure 10:
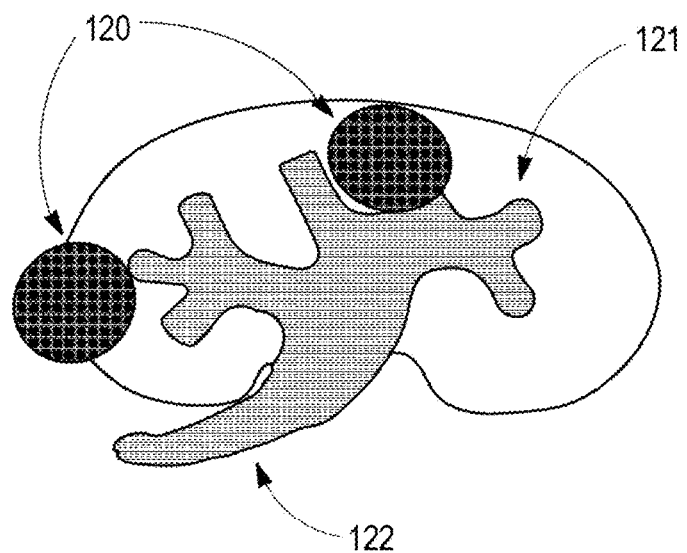
FIG. 10 is a schematic diagram illustrating an organ model (hydrogel structure) manufactured in Example 9 described later.

After fabrication of the object, the kidney model and the support were detached from each other as illustrated in FIG. 5, to form the solid freeform fabrication object (kidney model 1) of the present disclosure as illustrated in FIG. 10. The kidney model illustrated in FIG. 10 was formed of a tumor part 120, a normal part 121, and a ureter 122.

Example 7

A hydrogel structure 2 was prepared in the same manner as in Example 1, except that the hydrogel liquid precursor 15 was changed to the hydrogel liquid precursor 16 and the hydrogel liquid precursor 1 was changed to the hydrogel liquid precursor 12.

Evaluation

The Young's moduli of the ureter, the renal parenchyma, and the tumor part of the kidney model 1 and the kidney model 2 manufactured as described above were measured.

The Young's moduli were measured using a flexibility measuring system (manufactured by Horiuchi Electronics Co., Ltd.).

The kidney models were evaluated immediately after the preparation thereof and after they were stored for three days.

For storage, the kidney models were stored while being sealed in LAMIZIP (manufactured by Seisan Nipponsha Ltd.) for prevention of drying of the hydrogels.

The kidney models were intended as models for tumorectomy training. Hence, the renal parenchyma part was tested for cutting sharpness of an electric device (an ordinary electrosurgical instrument: PROG, manufactured by Morita Tokyo Mfg. Corp.).

Result

The results are shown in Table 7.

It can be seen that, by film formation by mixing of two hydrogel liquid precursors with adjustment of the ratio by volume, it was possible to control the physical property (Young's modulus) of the kidney model to be fabricated. The Young's modulus varied from part to part and the color developability varied at the same time, making the parts easily distinguishable. This state was kept unchanged through storage.

TABLE 7

|  | Part | Young's modulus (kPa) | |
|---|---|---|---|
|  |  | (Immediately after production) | (3 days after production) |
| Ex. 6 | Ureter | 70 | 70 |
|  | Renal parenchyma | 40 | 41 |
|  | Tumor | 58 | 59 |
| Ex. 7 | Ureter | 69 | 69 |
|  | Renal parenchyma | 39 | 40 |
|  | Tumor | 56 | 58 |

Further, the renal parenchyma part was cut with the electric device to extirpate the tumor.

The kidney models 1 and 2 were both successfully incised at the renal parenchyma part, enabling the tumor to be removed.

However, the kidney model 2 was slightly inferior to the kidney model 1 in cutting sharpness.

Preparation of Hydrogel Liquid Precursor 17

Pure water was prepared by evacuating deionized water for 30 minutes.

While stirring 70.0 parts by mass of pure water, 5.72 parts by mass of synthesized hectorite (laponite XLG, manufactured by Rockwood Additives Ltd.) having a composition of $Na^+_{0.66}[(Si_8Mg_{5.35}Li_{0.66})O_{20}(OH)_4]^-_{0.66}$ as laminate clay mineral was slowly added to the pure water followed by stirring to prepare a liquid dispersion.

Next, 0.29 percent by mass of etidronic acid (manufactured by Tokyo Chemical Industry Co. Ltd.) as the dispersant for the synthesized hectorite was added to the first liquid dispersion to obtain a second liquid dispersion.

Next, to the second liquid dispersion, 14 parts by mass of dimethyl acrylamide (DMAA, manufactured by Tokyo Chemical Industry Co., Ltd.) from which a polymerization inhibitor was removed by passing through active alumina column was added as the curable material. Furthermore, 0.065 parts by mass of N,N'-methylene bisacrylamide (MBAA, manufactured by Tokyo Chemical Industry Co. Ltd.) was added as a cross-linking agent. Glycerin (manufactured by Sakamoto Yakuhin Kogyo Co., Ltd.) (5.0 parts by mass) was admixed as a drying retardant in a form of an organic solvent.

Next, 0.172 parts by mass of N,N,N',N'-tetramethyl ethylenediamine (TEMED, manufactured by Tokyo Chemical Industry Co., Ltd.) was added as a polymerization accelerator and thereafter stirred and mixed. Subsequent to the stirring and mixing, the resultant was evacuated for ten minutes. Subsequently, the resultant was filtrated to remove, for example, impurities, to obtain a homogeneous hydrogel liquid precursor 17.

Preparation of Hydrogel Liquid Precursors 18 and 19

Hydrogel liquid precursors 18 and 19 were prepared in the same manner as in Preparation of Hydrogel Liquid Precursor 17 except that the prescription was changed as shown in Table 8. The values relating to the materials shown in Table 8 are represented in the unit of part by mass.

Preparation of Hydrogel Liquid Precursors 20 and 21

Hydrogel liquid precursors 20 and 21 were manufactured in the same manner as the hydrogel liquid precursor 17 except that N,N'-methylene bisacrylamide (MBAA) was replaced with diethylene glycol diacrylate (2EGA, manufactured by Tokyo Chemical Industry Co., Ltd.) as a cross-linking agent and the prescription amounts were changed as described in Table 8. The values relating to the materials shown in Table 8 are represented in the unit of part by mass.

TABLE 8

| Material (part by mass) | Hydrogel liquid precursor 17 | Hydrogel liquid precursor 18 | Hydrogel liquid precursor 19 | Hydrogel liquid precursor 20 | Hydrogel liquid precursor 21 |
|---|---|---|---|---|---|
| Pure water | 70.0 | 70.0 | 70.0 | 70.0 | 70.0 |
| Glycerin | 5.0 | 5.0 | 5.0 | 5.0 | 5.0 |
| Synthetic hectorite | 5.72 | 5.72 | 5.72 | 5.72 | 5.72 |
| Etidronic acid | 0.29 | 0.29 | 0.29 | 0.29 | 0.29 |
| DMAA | 14 | 14 | 14 | 14 | 14 |
| M BAA | 0.065 | 0.195 | 0.26 | 0 | 0 |
| 2 EGA | 0 | 0 | 0 | 0.18 | 0.26 |
| TEMED | 0.172 | 0.172 | 0.172 | 0.172 | 0.172 |
| Total amount | 95.25 | 95.38 | 95.44 | 95.36 | 95.54 |
| Moisture content (%) | 73.4 | 73.4 | 73.3 | 73.4 | 73.3 |
| Solvent concentration (%) | 78.7 | 78.6 | 78.6 | 78.6 | 78.5 |

Example 8

A total of 10 parts by mass of the hydrogel liquid precursor 17 and 1.1 parts by mass of the curing liquid used in Example 1 were stirred and mixed and cured while being sealed in a styrol rectangular case type 1 (manufactured by As One Corporation) for two hours, to manufacture an internal hydrogel 23 (FIG. 9).

A stirred/mixed product of the hydrogel liquid precursor 18 (40 parts by mass) and the curing liquid (4.4 parts by mass) was prepared and cured while being sealed in a styrol rectangular case type 3 (manufactured by As One Corporation) for two hours together with the internal hydrogel 23, to prepare the external hydrogel 24. As a result, a hydrogel structure 7 (25) enclosing the internal hydrogel 23 was manufactured as illustrated in FIGS. 9A and 9B (FIG. 9).

Example 9

A hydrogel structure 8 was prepared in the same manner as in Example 8, except that the hydrogel liquid precursor 18 was changed to the hydrogel liquid precursor 19.

Example 10

A hydrogel structure 9 was prepared in the same manner as in Example 8, except that the hydrogel liquid precursor 18 of Example 8 was changed to the hydrogel liquid precursor 20.

Example 11

A hydrogel structure 10 was prepared in the same manner as in Example 8, except that the hydrogel liquid precursor 18 of Example 8 was changed to the hydrogel liquid precursor 21.

Evaluation

Young's moduli of the external hydrogel 23 and the internal hydrogel 24 of the hydrogel structures 7 to 10 prepared as described above were measured. The results are shown in Table 9.

The Young's moduli were measured using a flexibility measuring system (manufactured by Horiuchi Electronics Co., Ltd.).

The hydrogel structures were evaluated immediately after the preparation thereof and after they were stored for three days.

For storage, the hydrogels were stored while being sealed in LAMIZIP (manufactured by Seisan Nipponsha Ltd.) for prevention of drying of the hydrogels.

The shapes of the hydrogel structures were visually checked. The results are shown in Table 9.

Result

As seen in Table 9, in Examples 8 to 11 (in which the moisture content of the hydrogels was 70 percent by mass or greater and the solvent concentration difference between adjacent parts was within 5 percent by mass), little or no change of the physical property (Young's modulus) was present and also, the shape did not change over time.

Further, it can be seen that varying the amount and the type of the multi-functional polymerizable monomer (cross-linking agent) enabled significantly varying the physical property values (Young's modulus).

TABLE 9

| | Hydrogel structure No. | *whether internal hydrogel or external hydrogel | Type of hydrogel liquid precursor | Young's modulus (kPa) (Immediately after production) | Young's modulus (kPa) (3 days after production) | Shape change |
|---|---|---|---|---|---|---|
| Ex. 8 | Hydrogel structure 7 | External | Hydrogel liquid precursor 18 | 99.8 | 100.1 | No change |
| | | Internal | Hydrogel liquid precursor 17 | 20 | 20.1 | |
| Ex. 9 | Hydrogel structure 8 | External | Hydrogel liquid precursor 19 | 140.3 | 140.5 | No change |
| | | Internal | Hydrogel liquid precursor 17 | 20.1 | 20 | |
| Ex. 10 | Hydrogel structure 9 | External | Hydrogel liquid precursor 20 | 15.2 | 15.4 | No change |
| | | Internal | Hydrogel liquid precursor 17 | 20 | 20.2 | |
| Ex. 11 | Hydrogel structure 10 | External | Hydrogel liquid precursor 21 | 29.8 | 29.9 | No change |
| | | Internal | Hydrogel liquid precursor 17 | 19.9 | 20.1 | |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A method of manufacturing a solid freeform fabrication object comprising:
    applying a plurality of hydrogel liquid precursors to form a liquid film while controlling an application position and an application amount of the plurality of hydrogel liquid precursors, each of the plurality of hydrogel liquid precursors having a moisture content of 70 percent by mass or greater and having a solvent concentration difference of 5 percent by mass or less from each other;
    curing the liquid film to obtain a cured film including a plurality of regions formed of hydrogels having respective physical properties; and
    laminating the cured film.

2. The method according to claim 1, wherein the applying includes repeating applying the plurality of hydrogel liquid precursors at a same position with an amount ratio in a same plane while changing at least one of the application position and the amount ratio to produce a plurality of regions formed of hydrogel precursor mixtures having respective application amount ratios in the liquid film forming a same layer.

3. The method according to claim 1, wherein the plurality of hydrogel liquid precursors are applied according to a liquid droplet discharging method.

4. The method according to claim 1, wherein the application amounts of the plurality of hydrogel liquid precursors are adjusted by changing a volume of a liquid droplet to be applied.

5. The method according to claim 1, wherein the application amounts of the plurality of hydrogel liquid precursors are adjusted by changing a number of liquid droplets to be applied.

6. The method according to claim 1, wherein each of the plurality of hydrogel liquid precursors contains a water-containing solvent, a polymerizable monomer, and a mineral.

7. The method according to claim 1, wherein each of the plurality of hydrogel liquid precursors contains water and an organic solvent as solvents.

8. The method according to claim 1, wherein each of the plurality of hydrogel liquid precursors contains a multi-functional polymerizable monomer as a polymerizable monomer.

9. The method according to claim 1, wherein each of the plurality of hydrogel liquid precursors comprises at least one solvent, and wherein the at least one solvent is independently selected from the group consisting of an alkyl alcohol having 1 to 4 carbon atoms, an amide, a ketone, a ketone alcohol, an ether, a polyvalent alcohol, a polyalkylene glycol, a lower alcohol ether of the polyvalent alcohol, and an alkanol amine.

10. The method according to claim 9, wherein the at least one solvent is selected from the group consisting of N-methyl-2-pyrrolidone, ethylene glycol, propylene glycol, 1,2-propanediol, 1,2-butanediol, 1,3-butanediol, 1,4-butanediol, diethylene glycol, triethylene glycol, 1,2,6-hexanetriol, thioglycol, hexylene glycol, and glycerin.

11. The method according to claim 6, wherein the mineral of at least one of the each of the plurality of hydrogel liquid precursors is a water swellable laminate clay mineral.

12. The method according to claim 6, wherein the mineral of each of the plurality of hydrogel liquid precursors is, independently, one or more selected from the group consisting of water swellable hectorite containing sodium as an interlayer ion, water swellable montmorillonite, water swellable saponite, and water swellable synthesized mica.

13. The method according to claim 6, wherein the polymerizable monomer of each of the hydrogel liquid precursors is one or more compounds having an ethylenic unsaturated group, the ethylenic unsaturated group being independently selected from the group consisting of (meth)acrylamide group, (meth)acrylate compounds, a meth)acryloyl group, compounds having a vinyl group, an allyl group, and a cyclic ether group curable by a photoacid generator that produces an acid.

14. The method according to claim 6, wherein the polymerizable monomer of each of the hydrogel liquid precursors is one or more independently selected from the group consisting of acrylamide, N-substituted acrylamide derivatives, N,N-di-substituted acrylamide derivatives, N-substituted methacrylamide derivatives, N-N-di-substituted methcrylamide derivatives, 2-etylhexyl(meth)acrylate (EHA), 2-hydroxyethyl(meth)acrylate (HEA), 2-hydroxypropyl(meth)acrylate (HPA), caprolactone-modified tetrahydrofurfuryl(meta)acrylate, isobonyl(meth)acrylate, 3-methoxybutyl(meth)acrylate, tetrahydro furfuryl(meth)acrylate, lauryl(meth)acrylate, 2-phenoxyethyl(meth)acrylate, isodecyl(meth)acrylate, isooctyl(meth)acrylate, tridecyl(meth)acrylate, caprolactone(meth)acrylate, ethoxylated nonylphenol(meth)acrylate, N,N-dimethylacrylamide, N-isopropylacrylamide, acryloyl morpholine, tripropylene glycol di(meth)acrylate, triethylene glycol di(meth)acrylate, tetraethylene glycol di(meth)acrylate, polypropylene glycol di(meth)acrylate, neopentyl glycol hydroxypivalic acid ester di(meth)acrylate (MANDA), hydroxypivalic acid neopentyl glycol ester di(meth)acrylate (HPNDA), 1,3-butanediol di(meth)acrylate (BGDA), 1,4-butanediol di(meth)acrylate (BUDA), 1,6-hexanediol di(meth)acrylate (HDDA), 1,9-nonanediol di(meth)acrylate, diethylene glycol di(meth)acrylate (DEGDA), neopentyl glycol di(meth)acrylate (NPGDA), tripropylene glycol di(meth)acrylate (TPGDA), caprolactone-modified hydroxypivalic acid neopentyl glycol ester di(meth)acrylate, propoxylated neopentyl glycol di(meth)acrylate, ethoxy-modified bisphenol A di(meth)acrylate, polyethylene glycol 200 di(meth)acrylate, polyethylene glycol 400 di(meth)acrylate, methylene bisacrylamide, trimethylolpropane tri(meth)acrylate (TMPTA), pentaerythritol tri(meth)acrylate (PETA), dipentaerythritol hexa(meth)acrylate (DPHA), triallyl isocyanate, ε-caprolactone-modified dipentaerythritol (meth)acrylate, tris(2-hydroxyethyl)isocyanurate tri(meth)acrylate, ethoxylated trimethylolpropane tri(meth)acrylate, propoxylated trimethylolpropane tri(meth)acrylate, propoxylated glyceryl tri(meth)acrylate, pentaerythritol tetra(meth)acrylate, dipentaerythritol hydroxypenta (meth)acrylate, ditrimethylolpropane tetra(meth)acrylate, ethoxylated pentaerythritol tetra (meth)acrylate, and penta (meth)acrylate ester.

15. A method of manufacturing a solid freeform fabrication comprising:
applying a first hydrogel liquid precursor containing a water-containing solvent, a polymerizable monomer, and a mineral, and having a moisture content of 70 percent by mass or greater; and a second hydrogel liquid precursor compositionally different from the first hydrogel liquid precursor, having a solvent concentration difference of 5 percent by mass or less from the first hydrogel liquid precursor, and having a moisture content of 70 percent by mass or greater, to form a liquid film; and
curing the liquid film formed in the applying.

* * * * *